(12) United States Patent
Kano

(10) Patent No.: US 8,077,668 B2
(45) Date of Patent: Dec. 13, 2011

(54) RADIO COMMUNICATION TERMINAL, RADIO BASE STATION, AND PACKET COMMUNICATION METHOD

(75) Inventor: Jun Kano, Yokohama (JP)

(73) Assignee: Kyocera Corporation, Kyoto (JP)

( * ) Notice: Subject to any disclaimer, the term of this patent is extended or adjusted under 35 U.S.C. 154(b) by 511 days.

(21) Appl. No.: 12/361,155

(22) Filed: Jan. 28, 2009

(65) Prior Publication Data

US 2009/0245189 A1 Oct. 1, 2009

Related U.S. Application Data

(60) Provisional application No. 61/024,179, filed on Jan. 28, 2008.

(51) Int. Cl.
*H04W 24/02* (2009.01)

(52) U.S. Cl. .................................. 370/329; 370/468

(58) Field of Classification Search .................. 370/329, 370/338, 465, 468

See application file for complete search history.

(56) References Cited

U.S. PATENT DOCUMENTS

| | | | |
|---|---|---|---|
| 2006/0246900 A1* | 11/2006 | Zheng | 455/435.3 |
| 2006/0256719 A1* | 11/2006 | Hsu et al. | 370/230 |
| 2007/0058545 A1* | 3/2007 | Nookala et al. | 370/230 |

OTHER PUBLICATIONS

Wang, J. et al. The cdma2000 QoS, as developed in TSG-X. Last accessed Jul. 17, 2006 at ftp.3gpp2.org/TSGA/Working/2004/0920-Clearwater/TSG-A+C+X%/20QoS/X00-20040920-024- QoS%)/020presentation.pdf. 24 pp.*

"cdma2000 Wireless IP Network Standard: Quality of Service and Header Reduction" 3GPP2, Version 1.0, Feb. 2000.

* cited by examiner

*Primary Examiner* — Melvin Marcelo
(74) *Attorney, Agent, or Firm* — DLA Piper LLP (US)

(57) ABSTRACT

A radio communication terminal according to the present invention selects any one of a first session setting mode and a second session setting mode depending on a communication condition of the radio communication terminal. If the first session setting mode is selected, an auxiliary service instance and a main service instance are set on the same radio communication channel. If the second session setting mode is selected, a radio communication channel dedicated for an auxiliary service instance is set and the auxiliary service instance is set on the thus set radio communication channel.

8 Claims, 21 Drawing Sheets

FIG. 10

| MODULATION CLASS | MODULATION AND CODING RATES | | | | | UPLINK THROUGHPUT | | DOWNLINK THROUGHPUT | |
|---|---|---|---|---|---|---|---|---|---|
| | BIT/SYMBOL | SIGNAL SET | PUNCTURE | SHAPER | BLOCK CODE | MAC PAYLOAD SIZE (BITS) | THROUGHPUT (BPS) | MAC PAYLOAD SIZE (BITS) | THROUGHPUT (BPS) |
| 0 | 0.5 | π/2-BPSK | REPEAT | – | – | 56 | 11200 | 192 | 38400 |
| 1 | 0.67 | π/2-BPSK | 1 OF 4 | – | – | 80 | 16000 | 264 | 52800 |
| 2 | 1.0 | QPSK | – | – | – | 144 | 28800 | 424 | 84800 |
| 3 | 1.5 | QPSK | 2 OF 6 | – | – | 232 | 46400 | 648 | 129600 |
| 4 | 2.0 | 8-PSK | – | – | (64, 57) | 304 | 60800 | 824 | 164800 |
| 5 | 2.5 | 8-PSK | – | – | (64, 57) | 376 | 75200 | 1008 | 201600 |
| 6 | 3 | 12-QAM | 2 OF 6 | 3/4 | (48, 47) | 504 | 100800 | 1328 | 265600 |
| 7 | 3.5 | 16-QAM | 2 OF 6 | 4/4 | (64, 63) | 592 | 118400 | 1560 | 312000 |
| 8 | 4 | 24-QAM | 2 OF 6 | 5/4 | (80, 79) | – | – | 1784 | 356800 |

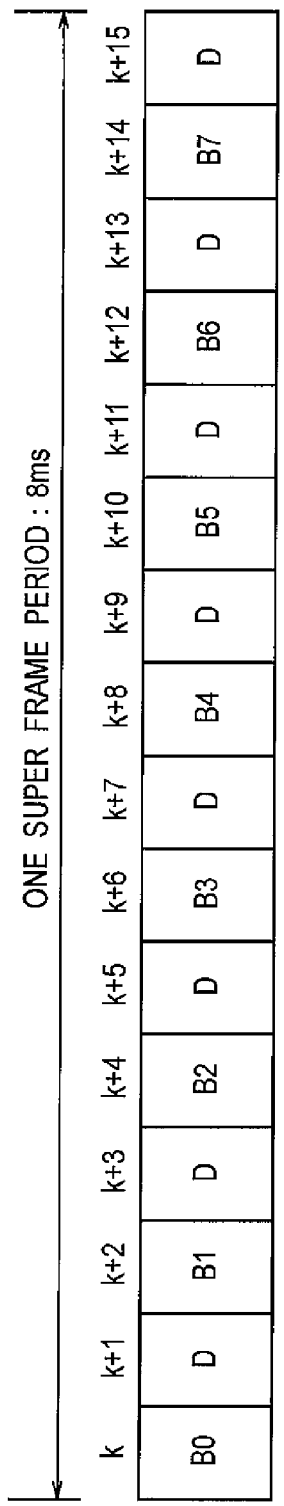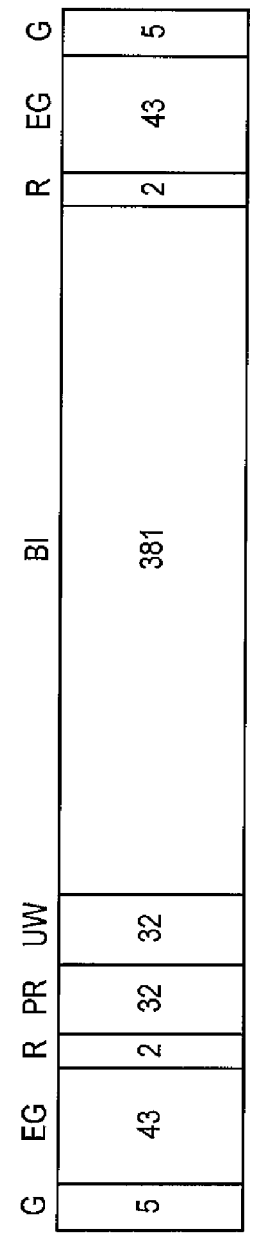

FIG. 12

SIZE OF PAYLOAD AND OVERHEAD IN MAIN SERVICE INSTANCE

| ELEMENTS | SIZE (OCTET) | |
|---|---|---|
| PPP PACKET PAYLOAD | X | TCP/IP OR THE LIKE |
| PPP HEADER | 10 | ·WHEN MAIN SERVICE OPTION (SO59) IS USED<br>·WHEN FCS WITH 4 OCTETS IS USED |
| SERVICE INSTANCE FLOW ID | 1 | ALWAYS 1 |
| L3 DELIMITER | 2 | 17 ≦ L3 PACKET SIZE ≦ 144 |
| TOTAL | X+13 | |

FIG. 13

SIZE OF PAYLOAD AND OVERHEAD IN AUXILIARY SERVICE INSTANCE
(WHEN SHARED CHANNEL MODE IS USED)

| ELEMENTS | SIZE (OCTET) | |
|---|---|---|
| CODEC PAYLOAD | X | IN THE CASE OF G729A (8KBPS) 2 CODEC PAYLOADS, X = 20 |
| ROHC PROTOCOL HEADER | Y | IN THE CASE OF SMALL CID AND UDP CHECK SUM, Y = 3 |
| PPP HEADER | 0 | OMITTED DUE TO USE OF SERVICE OPTION (SO67) |
| SERVICE INSTANCE FLOW ID | 1 | VALUE EQUAL TO OR LARGER THAN "2" |
| L3 DELIMITER | 2 | 17 ≦ L3 PACKET SIZE ≦ 144 |
| TOTAL | X+Y+3 | IN THE CASE OF X = 20 AND Y = 3, TOTAL IS 26, 26 * 8 * (1 / 0.02) = 10,400 (BPS) |

FIG. 14

SIZE OF PAYLOAD AND OVERHEAD IN AUXILIARY SERVICE INSTANCE
(WHEN OCCUPIED CHANNEL MODE IS USED)

| ELEMENT | SIZE (OCTET) | |
|---|---|---|
| CODEC PAYLOAD | X | IN THE CASE OF G729A (8KBPS) 2 CODEC PAYLOADS, X = 20 |
| ROHC PROTOCOL HEADER | Y | IN THE CASE OF SMALL CID AND UDP CHECK SUM, Y = 3 |
| PPP HEADER | 0 | OMITTED DUE TO USE OF SERVICE OPTION (SO67) |
| SERVICE INSTANCE FLOW ID | 0 | OMITTED SINCE CHANNEL IS OCCUPIED |
| L3 DELIMITER | 2 | $17 \leq$ L3 PACKET SIZE $\leq 144$ |
| TOTAL | X+Y+2 | IN THE CASE OF X = 20 AND Y = 3, TOTAL IS 25, 25 * 8 * (1 / 0.02) = 10,000 (BPS) |

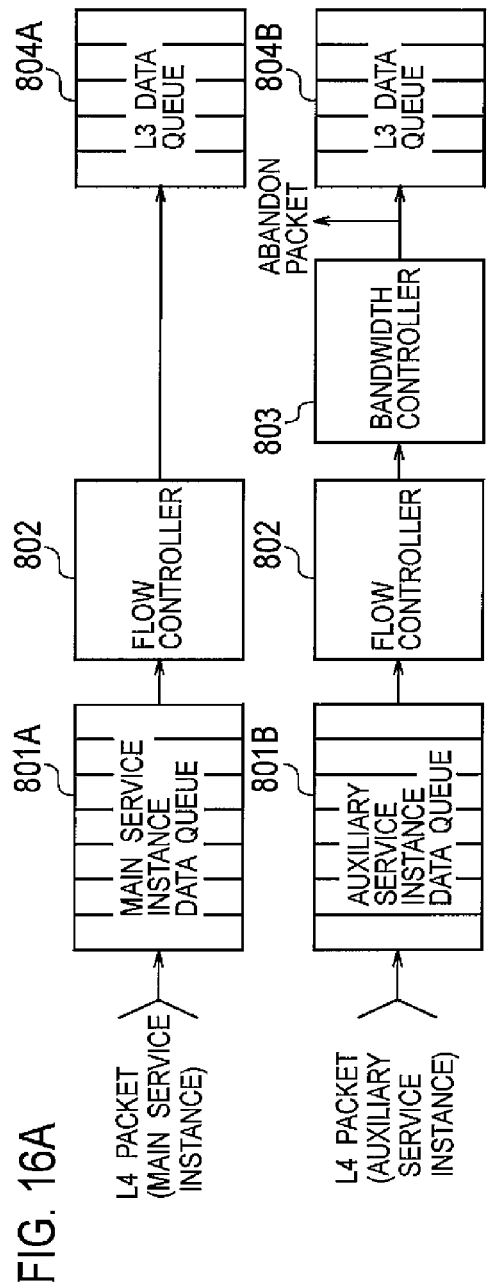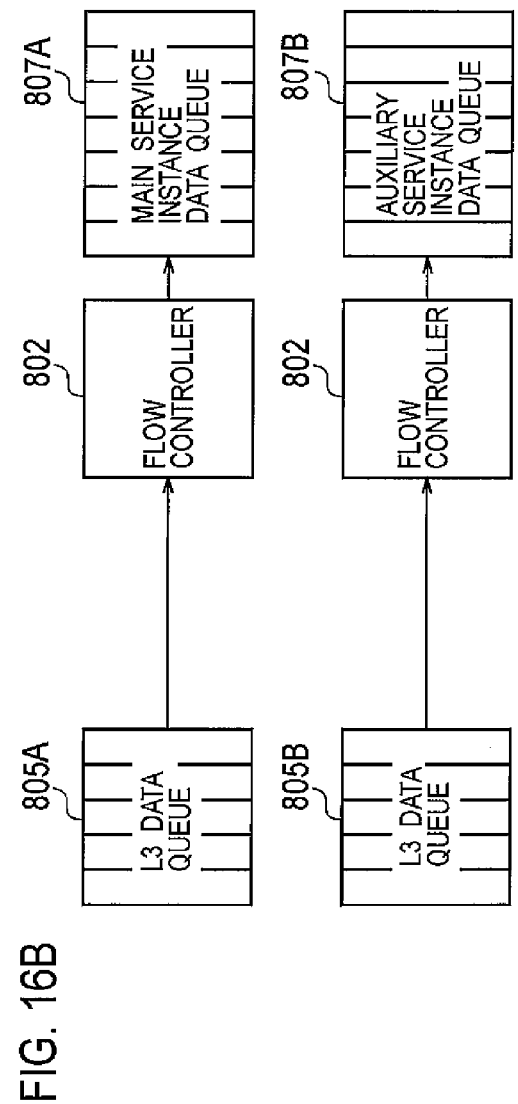

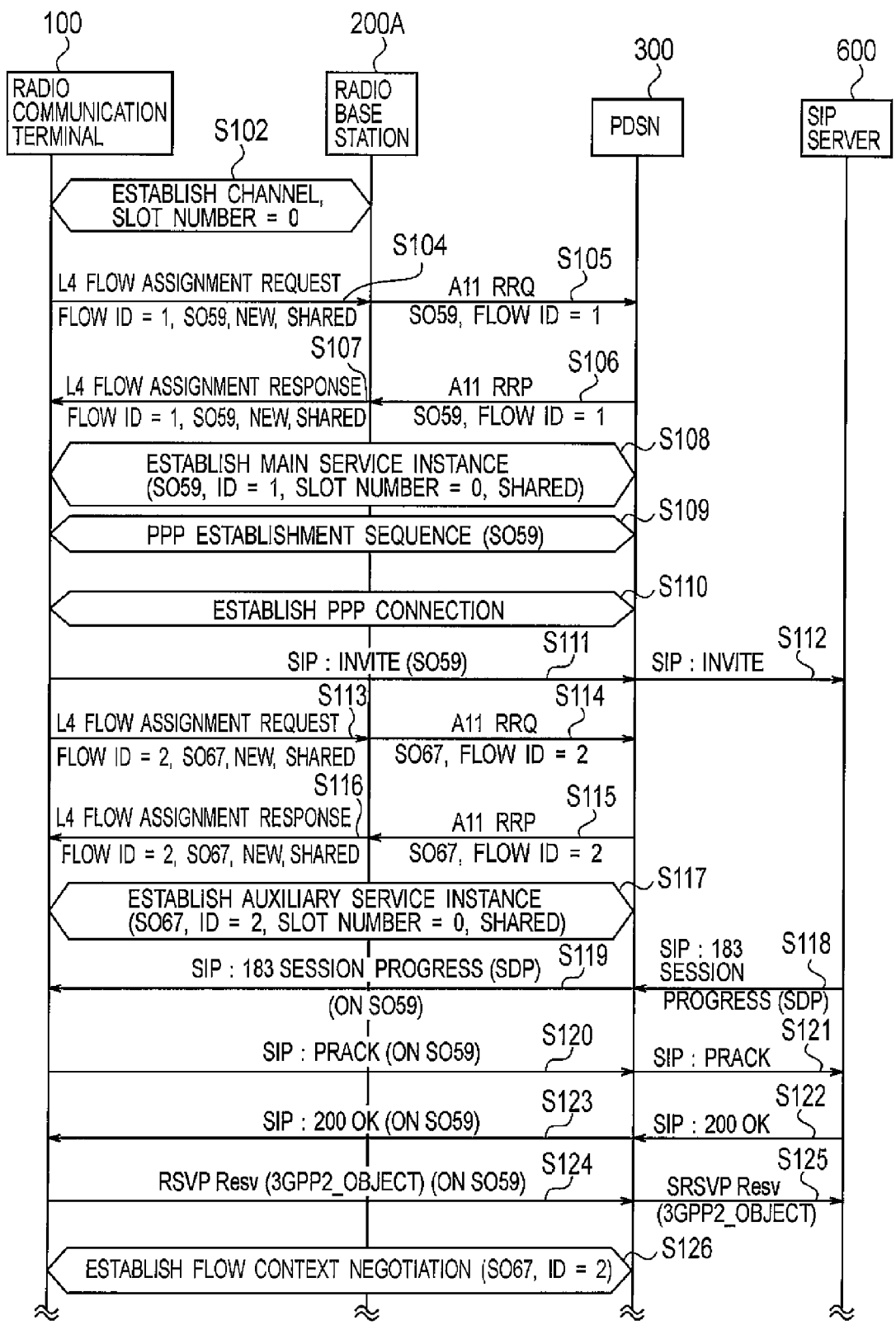

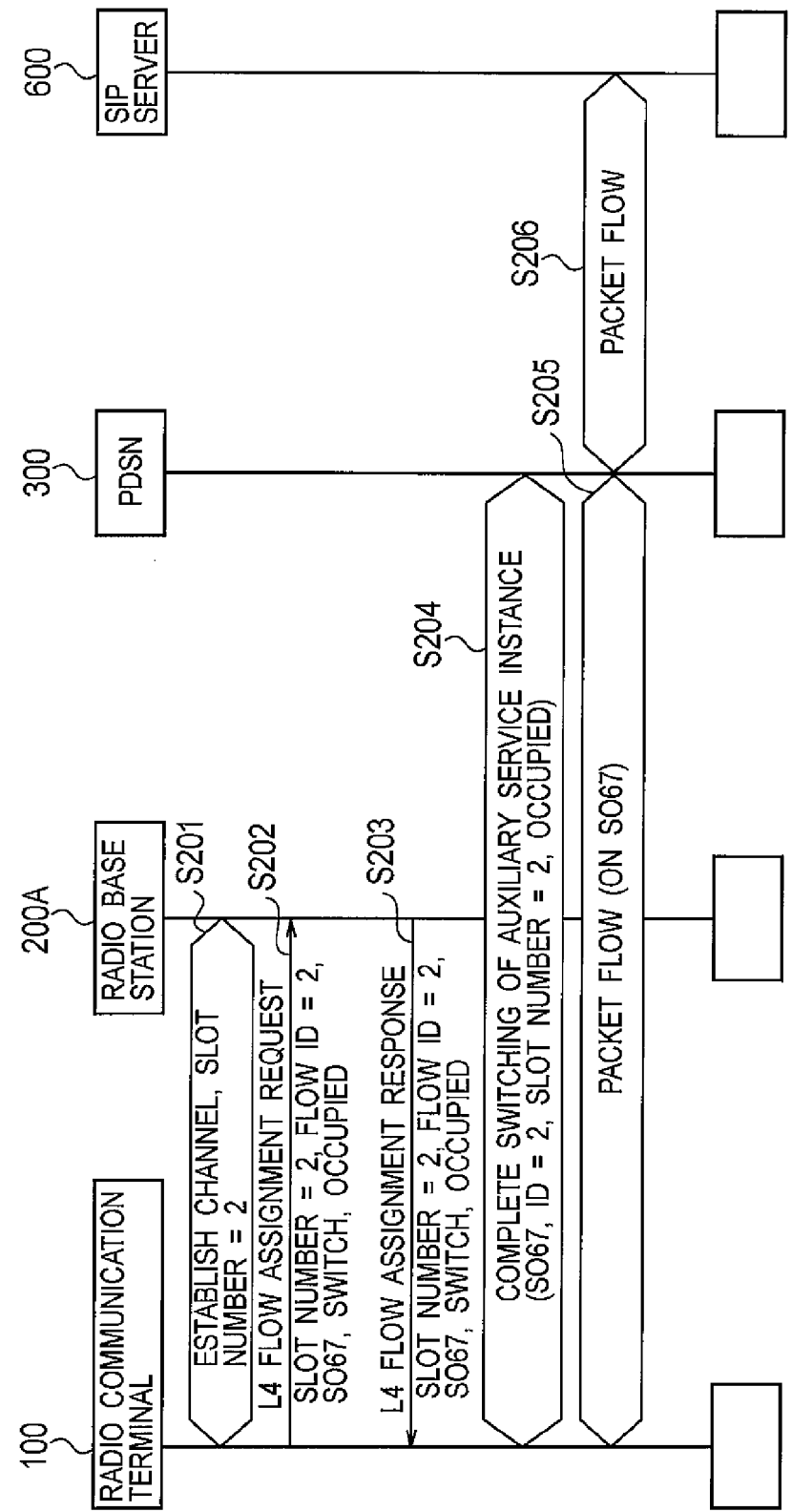

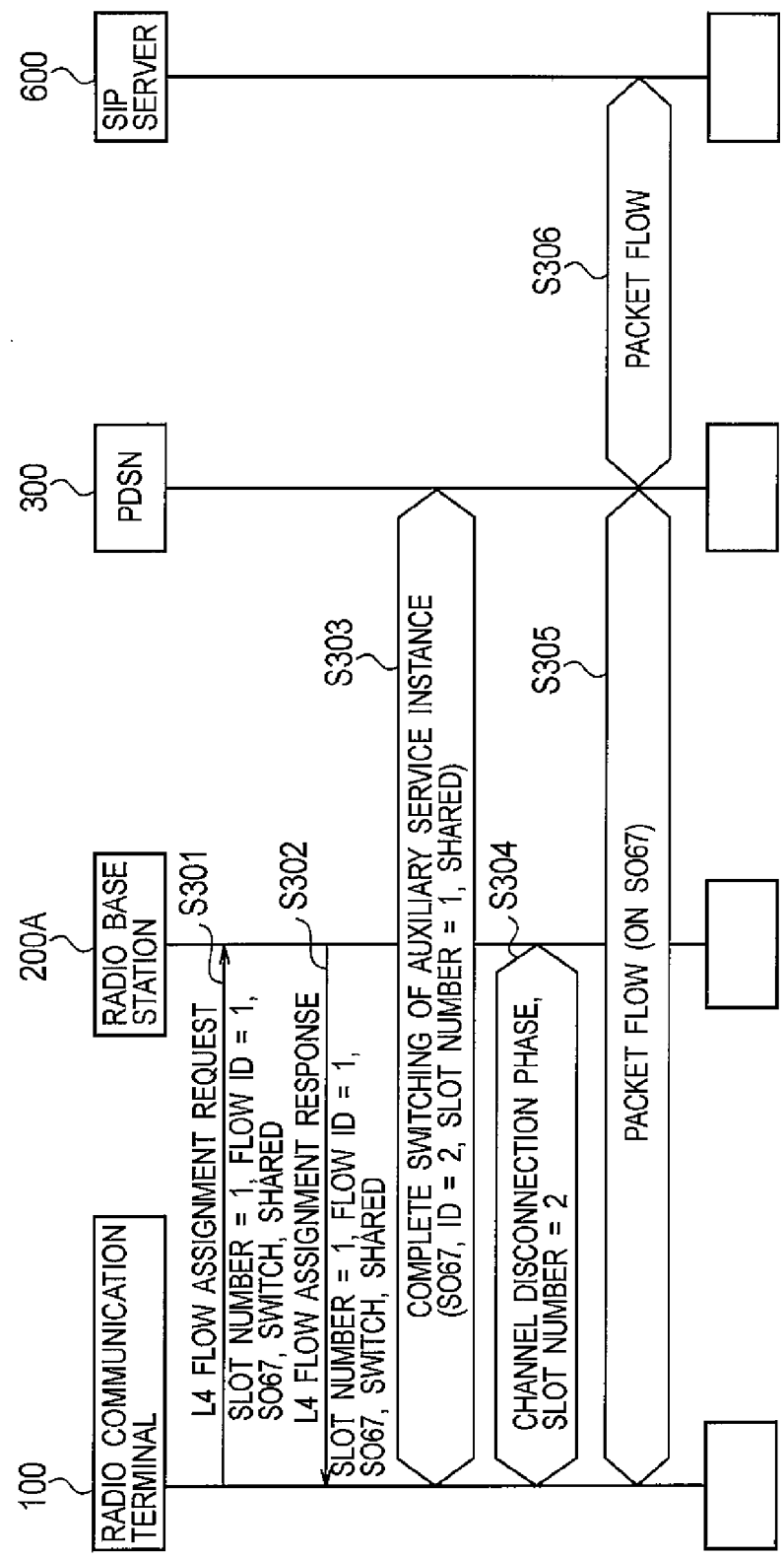

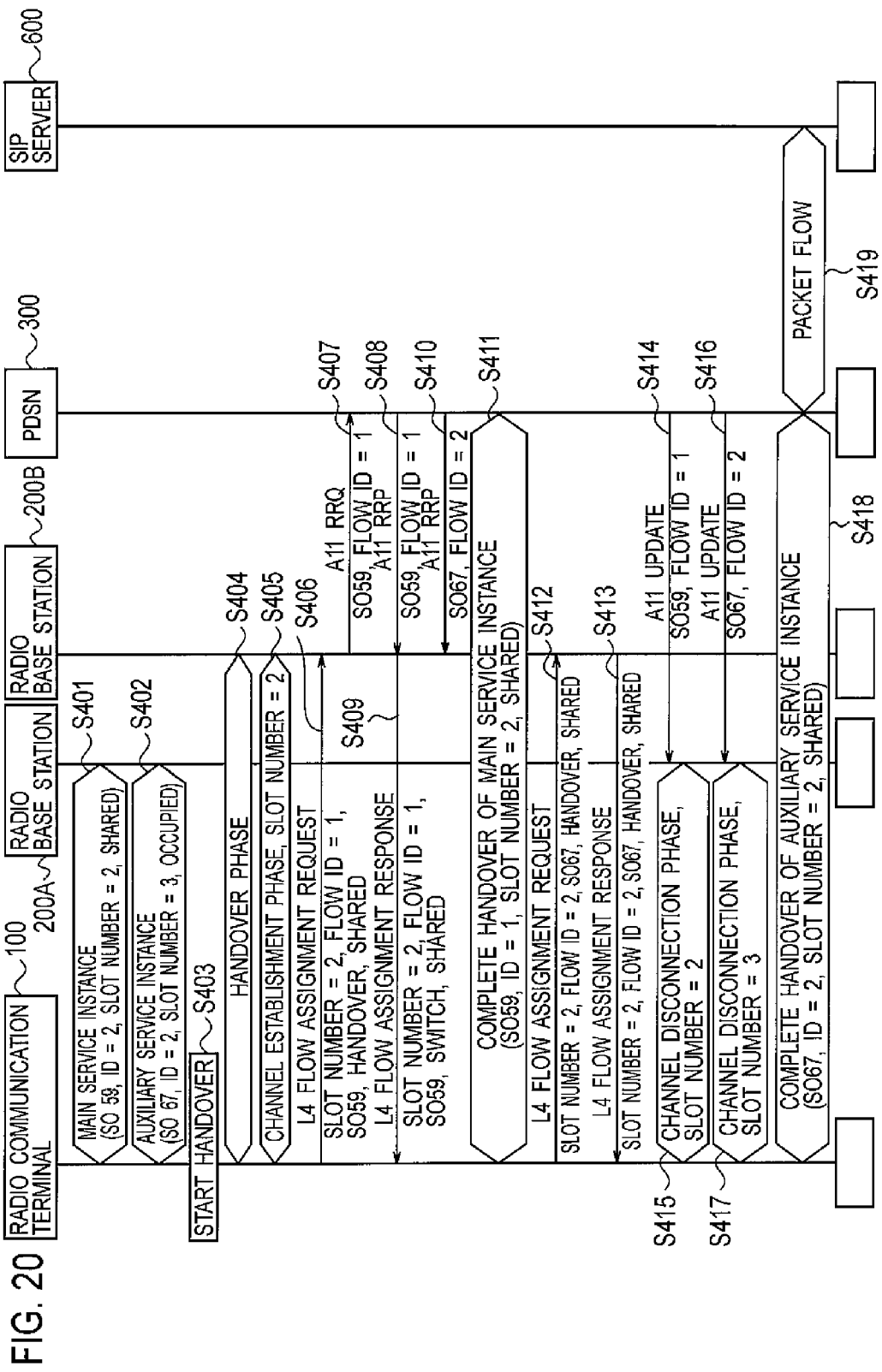

RADIO COMMUNICATION TERMINAL, RADIO BASE STATION, AND PACKET COMMUNICATION METHOD

BACKGROUND OF THE INVENTION

1. Field of the Invention

The present invention relates to a radio communication terminal, a radio base station, and a packet communication method which transmit and receive multiple types of packets.

2. Description of the Related Art

In a radio communication system, a radio communication terminal sets a radio communication channel between the radio communication terminal and a radio base station so as to communicate with a communication destination device through the radio base station. The radio communication channel is configured by using at least one physical channel defined by a physical resource (such as time or frequency).

In such radio communication system, it becomes more popular to transmit packets such as a packet including coded voice data which needs to control transmission delay. In addition to such a type of packets, another type of packets, such as a control packet including control data used for establishing or maintaining communications are also transmitted. The latter type of packets has a low necessity of controlling transmission delay.

For this reason, there is used an approach of setting a first communication session and a second communication session between a radio communication terminal and a communication destination device of the radio communication terminal (see X.S0011-004-D "cdma2000 Wireless IP Network Standard: Quality of Service and Header Reduction" (3GPP2)). The first communication session is a logical communication path used for transmitting a particular type of packet, that is, packet that needs to control transmission delay. The second communication session is a logical communication path used for transmitting a type of packet different from the particular type of packet.

According to such an approach, QoS control can be performed in which a packet transmitted by using the first communication session has a priority over a packet transmitted by using the second communication session, thereby suppressing the transmission delay of the packet transmitted by using the first communication session.

SUMMARY OF THE INVENTION

Recently, a radio communication terminal and a radio base station have become capable of communicating with each other by using multiple radio communication channels. Accordingly, there are various possible session setting modes for setting first and second communication sessions on radio communication channels.

Thus, by selectively using an appropriate one of the session setting modes, a packet transmission characteristic suitable for a communication condition of a radio communication terminal can be obtained. Conventionally, however, one session setting mode is fixedly used. Therefore, there is a problem that the session setting mode cannot be adapted to the communication condition of the radio communication terminal.

In this regard, the present invention has been made with a view to overcoming such problem. Accordingly, an object of the present invention is to provide a radio communication terminal, a radio base station, and a packet communication method, which are capable of adapting a session setting mode to a communication condition of the radio communication terminal, the session setting mode setting a first communication session and a second communication session on radio communication channels.

A first aspect of the present invention provides a radio communication terminal (a radio communication terminal 100) which transmits and receives a multiple of types of packets including a particular type of packet (for example, a RTP packet) to and from a communication destination device (for example, a PDSN 300, an SIP telephone 500, or an SIP server 600) through a radio base station (a radio base station 200). The radio communication terminal includes: a radio communication channel setting unit (a radio communication unit) configured to set radio communication channels (radio communication channels CH) between the radio communication terminal and the radio base station, the radio communication channels each being formed of at least one physical channel defined by a physical resource; a communication session setting unit (a controller 110) configured to set a first communication session (an auxiliary service instance ASI) and a second communication session (a main service instance MSI) between the radio communication terminal and the communication destination device, the first communication session being a logical communication path used for transmitting the particular type of packet, the second communication session being a logical communication path used for transmitting a type of packet different from the particular type of packet; and a session setting mode selector (a controller 110) configured to select any one of a first session setting mode (a shared channel mode) and a second session setting mode (an occupied channel mode) depending on a communication condition of the radio communication terminal, the first session setting mode including setting the first communication session and the second communication session on one of the radio communication channels, the second session setting mode including setting the first communication session and the second communication session on different ones of the radio communication channels. In the radio communication terminal, the communication session setting unit sets the first communication session and the second communication session on one of the radio communication channels if the first session setting mode is selected by the session setting mode selector; the radio communication channel setting unit sets one of the radio communication channels to be dedicated for the first communication session if the second session setting mode is selected by the session setting mode selector; and the communication session setting unit sets the first communication session on the radio communication channel dedicated for the first communication session if the radio communication channel dedicated for the first communication session is set by the radio communication channel setting unit.

According to such an aspect, in the first session setting mode, all types of packets are transmitted by using one radio communication channel. Therefore, if a communication bandwidth per radio communication channel is wide, the communication bandwidth can be utilized to the utmost extent.

In the second session setting mode, the particular type of packet is transmitted by using the dedicated radio communication channel. Therefore, even if a communication bandwidth per radio communication channel is narrow, transmission delay of the particular type of packet can be controlled.

The communication bandwidth per radio communication channel and the number of radio communication channels assignable to the radio communication terminal change depending on a communication condition of the radio communication terminal. Accordingly, by selecting any one of the first session setting mode and the second session setting mode depending on the communication condition of the radio communication terminal, the session setting mode can be adapted to the communication condition of the radio communication terminal.

A second aspect of the present invention relates to the first aspect of the present invention, and further includes a handover executing unit (a radio communication unit 102) configured to execute a handover to switch the radio base station of a connection destination. The session setting mode selector selects the first session setting mode if the handover is executed by the handover executing unit.

A third aspect of the present invention relates to the first aspect of the present invention, in which the session setting mode selector acquires radio quality information (for example, a modulation class) showing a radio quality between the radio communication terminal and the radio base station, the session setting mode selector determines whether or not the radio quality is improved, based on the acquired radio quality information, and the session setting mode selector selects the first session setting mode if it is determined that the radio quality is improved.

A fourth aspect of the present invention relates to the first aspect of the present invention, in which the session setting mode selector acquires radio quality information showing a radio quality between the radio communication terminal and the radio base station; determines whether or not the radio quality is deteriorated, based on the acquired radio quality information; and selects the second session setting mode if it is determined that the radio quality is deteriorated.

A fifth aspect of the present invention relates to the first aspect of the present invention, and further includes a session identifier adding unit (a controller 110) configured to add a session identifier (a service instance flow ID) to the particular type of packet when the first session setting mode is selected by the session setting mode selector, the session identifier indicating that packet transmission is made by using the first communication session. The session identifier adding unit omits the addition of the session identifier to the particular type of packet if the second session setting mode is selected by the session setting mode selector.

A sixth aspect of the present invention relates to the first aspect of the present invention, in which the particular type of packet is a packet which needs to be transmitted with a transmission delay shorter than that for the type of packet different from the particular type of packet.

A seventh aspect of the present invention provides a radio base station (a radio base station 200A) which transmits and receives a multiple of types of packets including a particular type of packet to and from a radio communication terminal (a radio communication terminal 100). The radio base station includes: a radio communication channel setting unit (a radio communication unit 202) configured to set radio communication channels between the radio base station and the radio communication terminal, the radio communication channels each being formed of at least one physical channel defined by a physical resource; a communication session setting unit (a controller 210) configured to set a first communication session and a second communication session between the radio communication terminal and a communication destination device of the radio communication terminal, the first communication session being a logical communication path used for transmitting the particular type of packet, the second communication session being a logical communication path used for transmitting a type of packet different from the particular type of packet; and a session setting mode selector (a controller 210) configured to select any one of a first session setting mode and a second session setting mode depending on a communication condition of the radio communication terminal, the first session setting mode including setting the first communication session and the second communication session on one of the radio communication channels, the second session setting mode including setting the first communication session and the second communication session on different ones of the radio communication channels. In the radio base station, the communication session setting unit sets the first communication session and the second communication session on one of the radio communication channels if the first session setting mode is selected by the session setting mode selector; the radio communication channel setting unit sets one of the radio communication channels to be dedicated for the first communication session if the second session setting mode is selected by the session setting mode selector; and the communication session setting unit sets the first communication session on the radio communication channel dedicated for the first communication session if the radio communication channel dedicated for the first communication session is set by the radio communication channel setting unit.

An eight aspect of the present invention provides a packet communication method for transmitting and receiving a multiple of types of packets including a particular type of packet through a radio base station between a radio communication terminal and a communication destination device with which the radio communication terminal communicates. The packet communication method includes the steps of: setting radio communication channels between the radio communication terminal and the radio base station, the radio communication channels each being formed of at least one physical channel defined by a physical resource; setting a first communication session and a second communication session between the radio communication terminal and the communication destination device, the first communication session being a logical communication path used for transmitting the particular type of packet, the second communication session being a logical communication path used for transmitting a type of packet different from the particular type of packet; and selecting any one of a first session setting mode and a second session setting mode depending on a communication condition of the radio communication terminal, the first session setting mode including setting the first communication session and the second communication session on one of the radio communication channels, the second session setting mode including setting the first communication session and the second communication session on different ones of the radio communication channels. In the step of setting the communication session, the first communication session and the second communication session are set on one of the radio communication channels if the first session setting mode is selected by the selecting step. In the step of setting the radio communication channels, one of the radio communication channels is set to be dedicated for the first communication session if the second session setting mode is selected by the selecting step. In the step of setting the communication session, the first communication session is set on the radio communication channel dedicated for the first communication session if the radio communication channel dedicated for the first communication session is set in the step of setting the radio communication channels.

According to the present invention, a radio communication terminal, a radio base station, and a packet communication method, which are capable of adapting a session setting mode setting a first communication session and a second session mode on a radio communication channel to a communication condition of the radio communication terminal can be provided.

BRIEF DESCRIPTION OF THE DRAWINGS

FIG. 10 is a diagram showing a modulation class of adaptive modulation which is carried out in the radio communication terminal and the radio base station according to the embodiment of the present invention.

FIGS. 11A and 11B are diagrams showing a super frame configuration and a broadcast information frame format which are used for a radio communication between the radio communication terminal and the radio base station according to the embodiment of the present invention.

FIG. 12 is a table showing a size of a payload and header in the main service instance according to the embodiment of the present invention.

FIG. 13 is a table showing a size of a payload and header in the auxiliary service instance (when the shared channel mode is used) according to the embodiment of the present invention.

FIG. 14 is a table showing a size of a payload and header in the auxiliary service instance (when the occupied channel mode is used) according to the embodiment of the present invention.

FIGS. 16A and 16B are diagrams for illustrating a packet flow control process in the occupied channel mode according to the embodiment of the present invention.

FIG. 17 is a sequence diagram showing a set-up operation of a service instance in the communication system according to the embodiment of the present invention.

FIG. 18 is a sequence diagram showing an operation of switching from the shared channel mode to the occupied channel mode according to the embodiment of the present invention.

FIG. 19 is a sequence diagram showing an operation of switching from the occupied channel mode to the shared channel mode according to the embodiment of the present invention.

FIG. 20 is a sequence diagram showing a handover operation in which the radio communication terminal switches the destination radio base station according to the embodiment of the present invention.

DESCRIPTION OF THE PREFERRED EMBODIMENT

Figure 1:
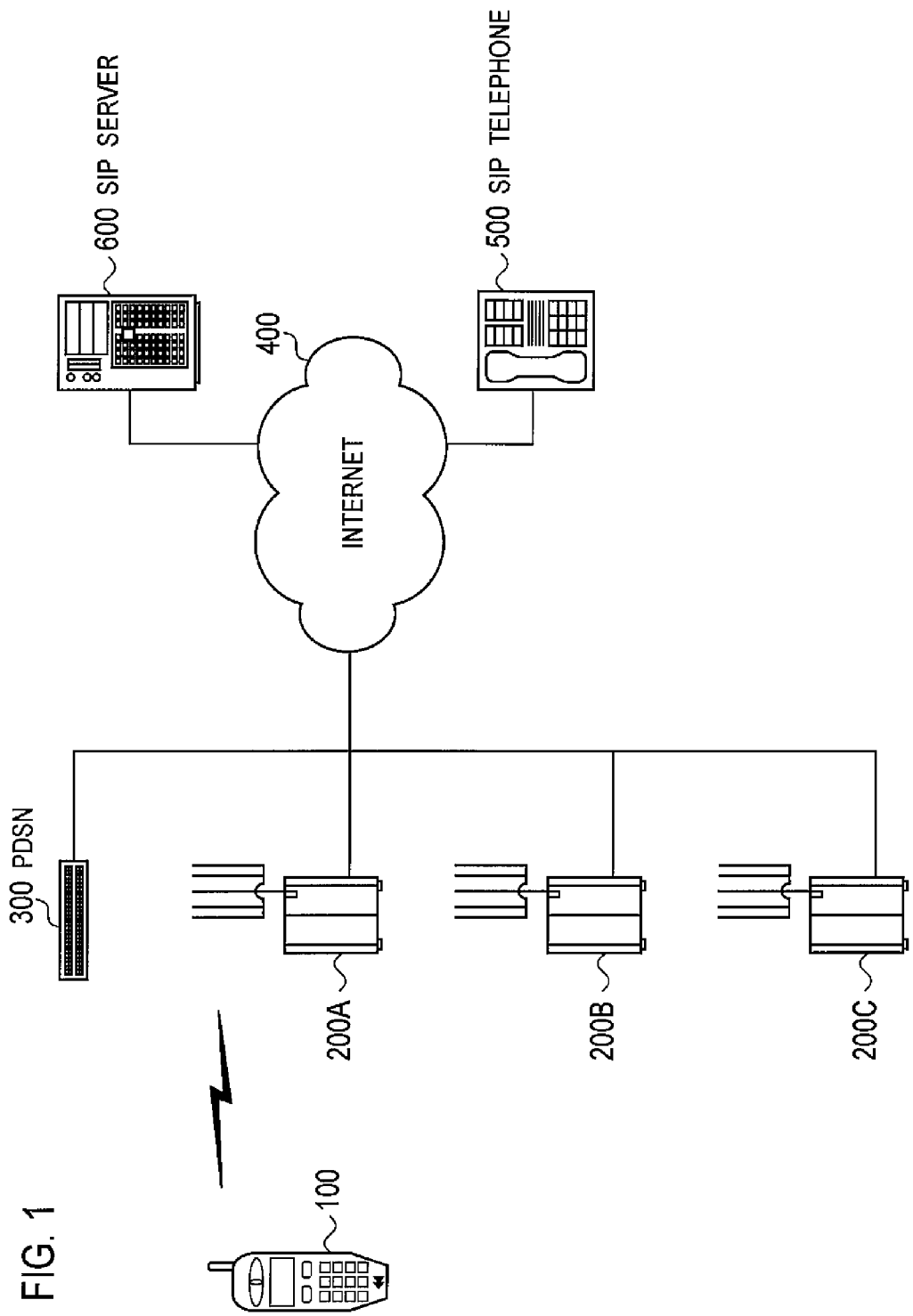
FIG. 1 is a general schematic configuration diagram of a communication system according to an embodiment of the present invention.

Next, a communication system according to an embodiment of the present invention will be described by referring to the drawings. Specifically, the description will be given in the following order: (1) Outline of the Communication System, (2) Detailed Configuration of the Communication System, (3) Shared so Channel Mode and Occupied Channel Mode, (4) Packet Configuration in Each Service Instance, (5) Packet Flow Control Processing; (6) Detailed Operation of the Communication System, (7) Advantageous Effects, and (8) Other Embodiments.

In the following description of the drawings in the below embodiment, same or similar reference numerals are given to same or similar portions.

(1) Outline of the Communication System

Firstly, a schematic configuration of the communication system according to the present embodiment will be described by referring to FIGS. 1 to 5.

FIG. 1 is a general schematic configuration diagram of a communication system 10 according to the embodiment of the present invention. In the present embodiment, a communication system 10 which is applied to a VoIP (Voice over Internet Protocol) will be described.

As shown in FIG. 1, the communication system 10 includes a radio communication terminal 100, radio base stations 200A to 200C, a packet data serving node (PDSN) 300, the Internet 400, a session initiation protocol (SIP: RFC 3261 IETF) telephone 500, and an SIP server 600.

The radio communication terminal 100 and the radio base stations 200A to 200C have a configuration based on iBurst (a registered trademark) system which is a radio communication system capable of high-speed communications (for iBurst, see "High Capacity-Spatial Division Multiple Access (HC-SDMA)" ATIS-PP-0700-004.2007 (ATIS/ANSI)").

In the iBurst system, TDMA and SDMA/TDD communication modes are used. In addition, in the iBurst system, adaptive modulation (link adaptation) which selects a modulation class depending on a radio quality such as a signal-to-interference noise ratio (SINR) is introduced for the purpose of providing a higher transmission rate. In the adaptive modulation, an appropriate modulation scheme is selected from multiple modulation schemes such as BPSK (Binary Phase Shift Keying) and 24 QAM (Quadrature Amplitude Modulation), for example.

The radio communication terminal 100 is connected to the radio base station 200A and performs a radio communication with the radio base station 200A. The radio base stations 200B and 200C are radio base stations which are candidates to be connected with the radio communication terminal 100. The radio communication terminal 100 monitors broadcast information which is broadcasted by the radio base stations 200A to 200C even during the period when the radio communication terminal 100 communicates with the radio base station 200A. With this, the radio communication terminal 100 maintains a synchronized states with the radio base stations 200A and 200C, or retrieves a radio base station having a better condition (for example, a received signal strength).

The radio communication terminal 100 performs a handover to switch the destination radio base station to a radio base station having a better condition, when the radio communication terminal 100 is in motion, for example. Specifically, the radio communication terminal 100 compares the received signal strength of the broadcast signals respectively broadcasted by the radio base stations 200A to 200C, and switches the destination radio base station to a radio base station with the highest received signal strength.

The radio communication terminal 100, the radio base stations 200A to 200C, and the PDSN 300 are compatible with QoS control according to the above-described X.S0011-004-D. In X.S0011-004-D, the mechanism to reserve a bandwidth guarantees the QoS of packet flow which is transmitted from and received by a real-time application.

In the QoS control in X.S0011-004-D, multiple service instances are configured in one point-to-point-protocol (PPP) connection. In the present embodiment, the service instance means an abstract example of a propagation path for transferring packet flow. In X.S0011-004-D, the service instance is defined by types of service options (SO) to which different functions are respectively given.

As described above, the multiple service instances are set and are given of different types of QoS, and as a result, detailed QoS control can be achieved.

(1.2) Schematic Operation of the Communication System

Figure 2:
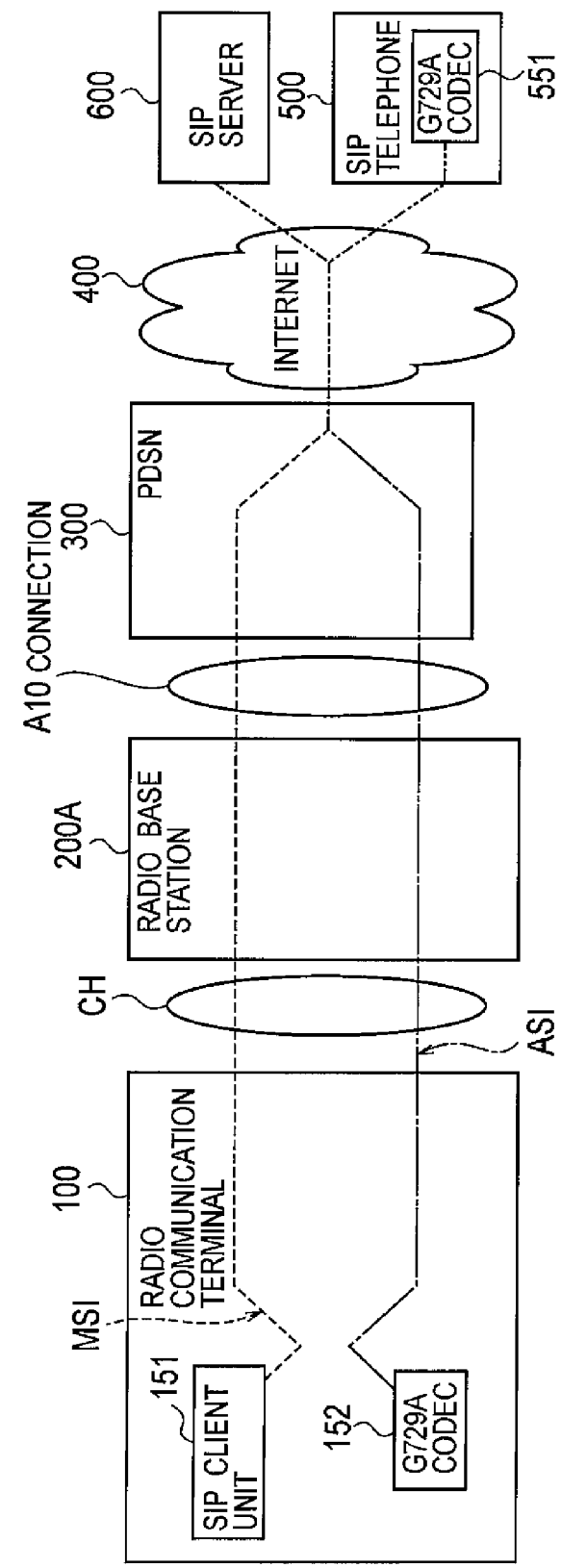
FIG. 2 is a functional block configuration diagram for illustrating a schematic operation of the communication system according to the embodiment of the present invention.

FIG. 2 is a schematic configuration diagram for illustrating a schematic operation of the communication system 10. In FIG. 2, the radio communication terminal 100 includes an SIP client unit 151 and a G729A codec 152. The SIP telephone 500 includes a G729A codec 551.

The radio communication terminal 100 firstly gives the radio base station 200A a request of connection with the radio base station 200A. The radio base station 200A receives the connection request from the radio communication terminal 100. Then, a radio communication channel CH is set between the radio communication terminal 100 and the radio base station 200A. The radio communication channel CH is configured by using at least one physical channel. In the present embodiment, a timeslot is equivalent to the physical channel.

The radio base station 200A has a function to relay packet flow transmitted and received between the radio communication terminal 100 and the PDSN 300. In addition, the radio base station 200A sets A10 connection between the radio base station 200A and the PDSN 300 by using an A11 signaling protocol.

The radio communication terminal 100, the radio base station 200A, and the PDSN 300 establish a main service instance (a second communication session) MSI between the radio communication terminal 100 and the PDSN 300 after the radio communication channel CH and the A10 connection are set.

The radio communication terminal 100 firstly establishes a main service instance MSI at the time of starting communications, for example, when turning the radio communication terminal 100 on. In the present embodiment, the main service instance MSI is established on one radio communication channel CH when PPP connection between the radio communication terminal 100 and the PDSN 300 is established.

If a service instance is established while the radio communication terminal 100, the radio base station 200A, and the PDSN 300 has not established a service instance, the established service instance is recognized as a main service instance MSI.

There is only one main service instance MSI for one PPP connection. In the main service instance MSI, all the packet flows which do not pass through another service instance are transmitted.

Specifically, the radio communication terminal 100 and the radio base station 200A store an association between the main service instance MSI and the radio communication channel CH. The radio base station 200A and the PDSN 300 store an association between the main service instance MSI and the A10 connection.

Then, the radio communication terminal 100 transmits a PPP connection request through the established main service instance MSI to the PDSN 300.

The PDSN 300 functions as a PPP server, and thus accepts the PPP connection request from the radio communication terminal 100 and assigns a global IP address to the radio communication terminal 100.

By using the global IP address assigned by the PDSN 300, the radio communication terminal 100 communicates with a network device connected to the Internet 400. In the present embodiment, the radio communication terminal 100 performs a voice communication with the SIP telephone 500. When a voice communication is started, the radio communication terminal 100 negotiates with the SIP server 600.

The radio communication terminal 100 negotiates with the PDSN 300 according to a resource reservation protocol (RSVP) which is defined by X.S0011-004-D, and establishes an auxiliary service instance (a first communication session) ASI.

Specifically, if the radio communication terminal 100, the radio base station 200A, and the PDSN 300 establish an additional service instance while the main service instance MSI has been already established, the additionally established service instance is recognized as an auxiliary service instance ASI. In this case, the radio communication terminal 100 does not exchange information for a PPP establishment with and does not acquire the global IP address from the PDSN 300.

A packet type selection method and a transmission method, which are negotiated according to RSVP, are applied to the auxiliary service instance ASI. As the packet type selection method, for example, contents such as an IP address of the SIP telephone 500, a UDP port number to be used, a RTP payload being G729A (8 Kbps), and the like, are negotiated. As the transmission method, for example, application of robust header compression (ROHC: RFC 3095 IETF) is negotiated.

In this manner, the packet type flowing through the auxiliary service instance ASI is limited so that special QoS can be given to the packet flow which is transmitted from and received by a real-time application.

The radio communication terminal 100 and the radio base station 200A store the association between the auxiliary service instance ASI and the radio communication channel CH. The radio base station 200A and the PDSN 300 store the association between the auxiliary service instance ASI and the A10 connection.

Once the auxiliary service instance ASI is established, the SIP server 600 establishes a RTP session for SIP telephone between the radio communication terminal 100 and the SIP telephone 500. Incidentally, the SIP is a protocol which connects a packet stream using RTP/UDP/IP protocol between any internet nodes. Once the RTP session is established, the radio communication terminal 100 can execute SIP telephone with the SIP telephone 500.

Incidentally, in the auxiliary service instance ASI, the type has been negotiated for each packet flow in advance, and thus an overhead which occurs specifically to the packet flow can be omitted. For example, in the service option 67 (SO67) in X.S0011-004-D, the auxiliary service instance ASI only transmits a packet of PPP flow, to which ROHC is applied. In the SO67, the PPP overhead is omitted.

(1.3) Protocol Stack

Next, a protocol stack applied to the communication system 10 will be described by referring to FIGS. 3 and 4.

Figure 3:
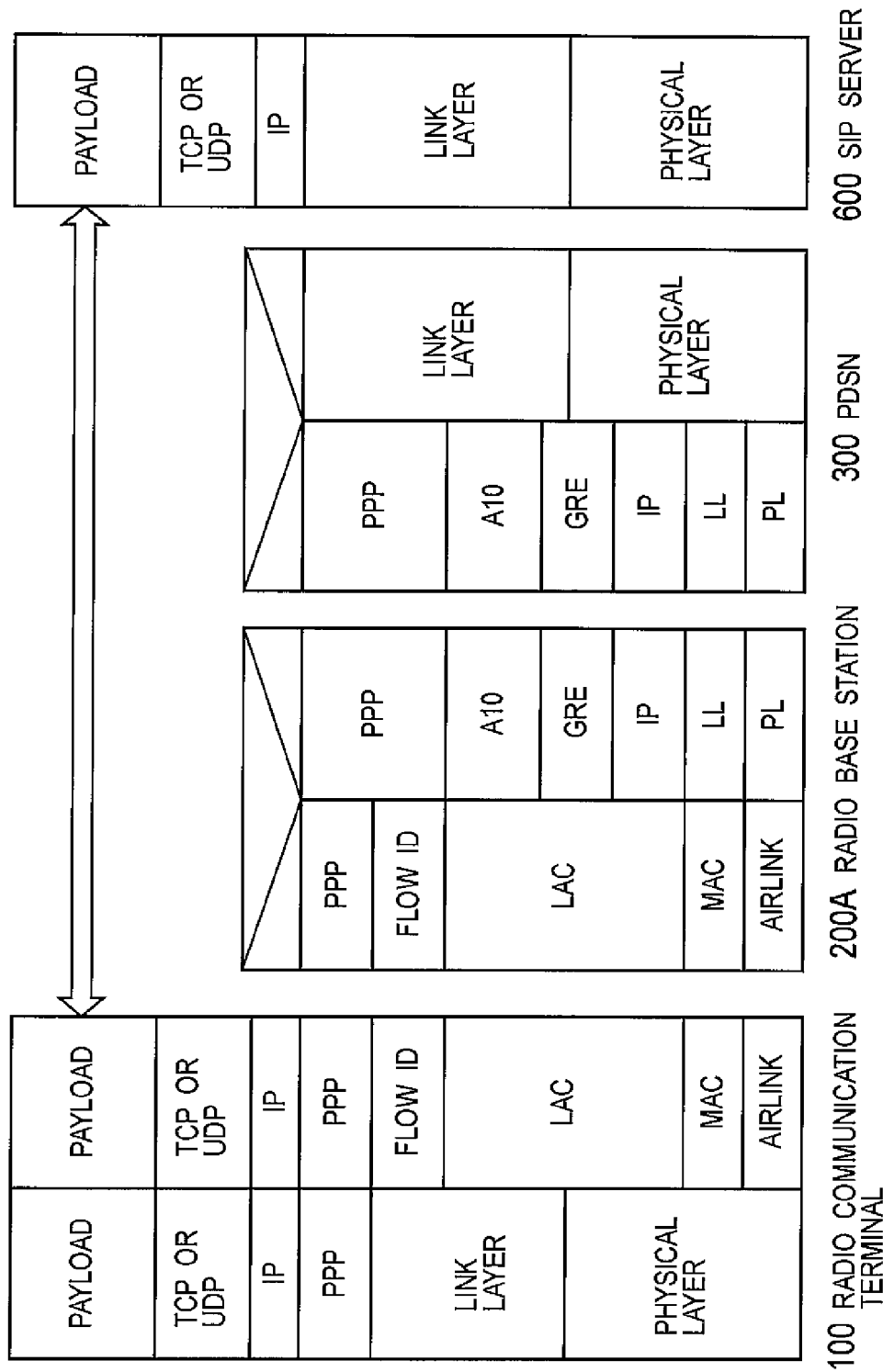
FIG. 3 is a diagram showing a protocol stack which is applied to a main service instance in the communication system according to the embodiment of the present invention.
Figure 4:
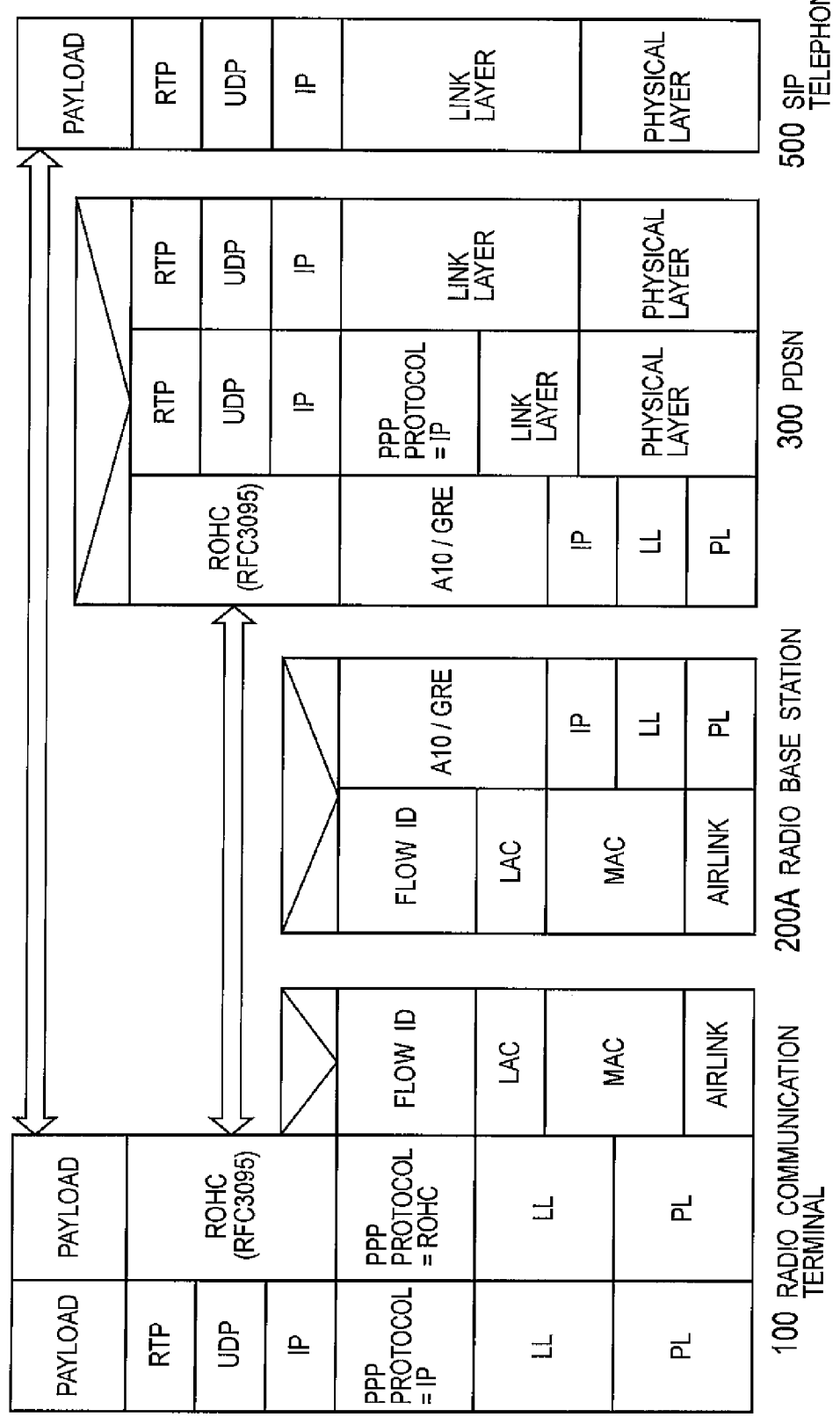
FIG. 4 is a diagram showing a protocol stack which is applied to an auxiliary service instance in the communication system according to the embodiment of the present invention.

FIG. 3 is a diagram showing a protocol stack which is applied to the main service instance MSI in the communication system 10. FIG. 4 is a diagram showing a protocol stack which is applied to the auxiliary service instance ASI in the communication system 10.

The ROHC is implemented on the radio communication terminal 100 and the PDSN 300 in the auxiliary service instance ASI. In the ROHC, the RTP/UDP/IP packet header, which is totally 40 bytes, is compressed by 2 bytes at minimum. Incidentally, in the voice communication over VoIP, two G729A (8 Kbps) codec packets are stored in one RTP/UDP/IP packet.

The service instance between the radio base station 200A and the PDSN 300 is achieved by the A10 connection according to generic routing encapsulation (GRE) RFC 2784. By establishing multiple A10 connections in one PPP connection, multiple service instances are established between the radio base station 200A and the PDSN 300.

The main service instance MSI is used for transmitting all the packet flows which do not pass through the auxiliary service instance ASI. The packet flow transmitted by using the main service instance MSI is not subjected to ROHC compression and to special processing in a layer higher than PPP.

The auxiliary service instance ASI is used for transmitting media packets such as voices and moving images. Accordingly, UDP (RFC 768 IETF) and RTP (RFC 1889 IETF) are used by using IP (RFC 791 IETF) as a lower layer. In addition, the overhead of the PPP header is removed between the radio communication terminal 100 and the radio base station 200A.

(1.4) Configuration of the Communication Frame

Figure 5:
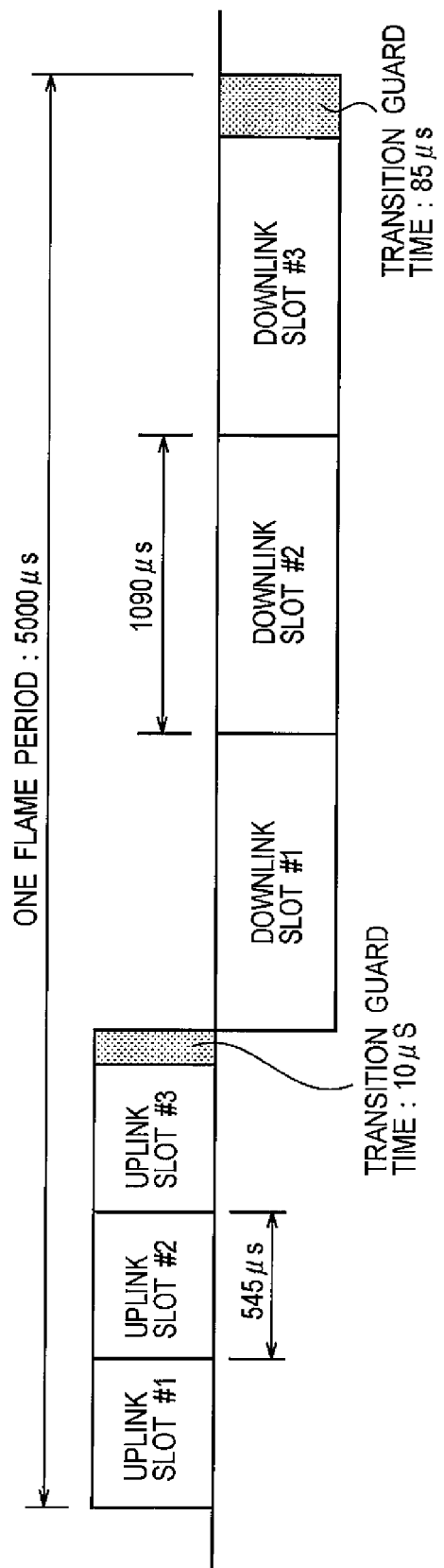
FIG. 5 is a frame configuration diagram of a communication frame used for a radio communication between the radio communication terminal and the radio base station according to the embodiment of the present invention.

FIG. 5 is a frame configuration diagram of a communication frame used for a radio communication between the radio communication terminal 100 and the radio base station 200A.

The radio base station 200A assigns a radio communication channel CH using a timeslot (hereinafter referred to as a "physical channel" when needed) according to the TDMA-TDD in response to the radio connection request from the radio communication terminal 100.

FIG. 5 shows that both uplink (the direction from the radio communication terminal 100 to the radio base station 200A) and downlink (the direction from the radio base station 200A to the radio communication terminal 100) are triplexed.

The lengths of timeslots in the uplink and downlink have asymmetric configurations to each other. In general, a radio communication channel in which one timeslot in the uplink and one timeslot in the downlink are associated with each other is assigned to the radio communication terminal 100. For example, the uplink slot #1 and the downlink slot #2 are assigned to the radio communication terminal 100.

(2) Detailed Configuration of the Communication System

Next, the detailed configuration of the communication system 10, specifically, configurations of the radio communication terminal 100, the radio base stations 200A to 200C, and the PDSN 300 will be described by referring to FIGS. 6 to 8. However, the radio base stations 200A to 200C have the same configuration, and thus only the radio base station 200A will be described.

(2.1) Configuration of the Radio Communication Terminal

Figure 6:
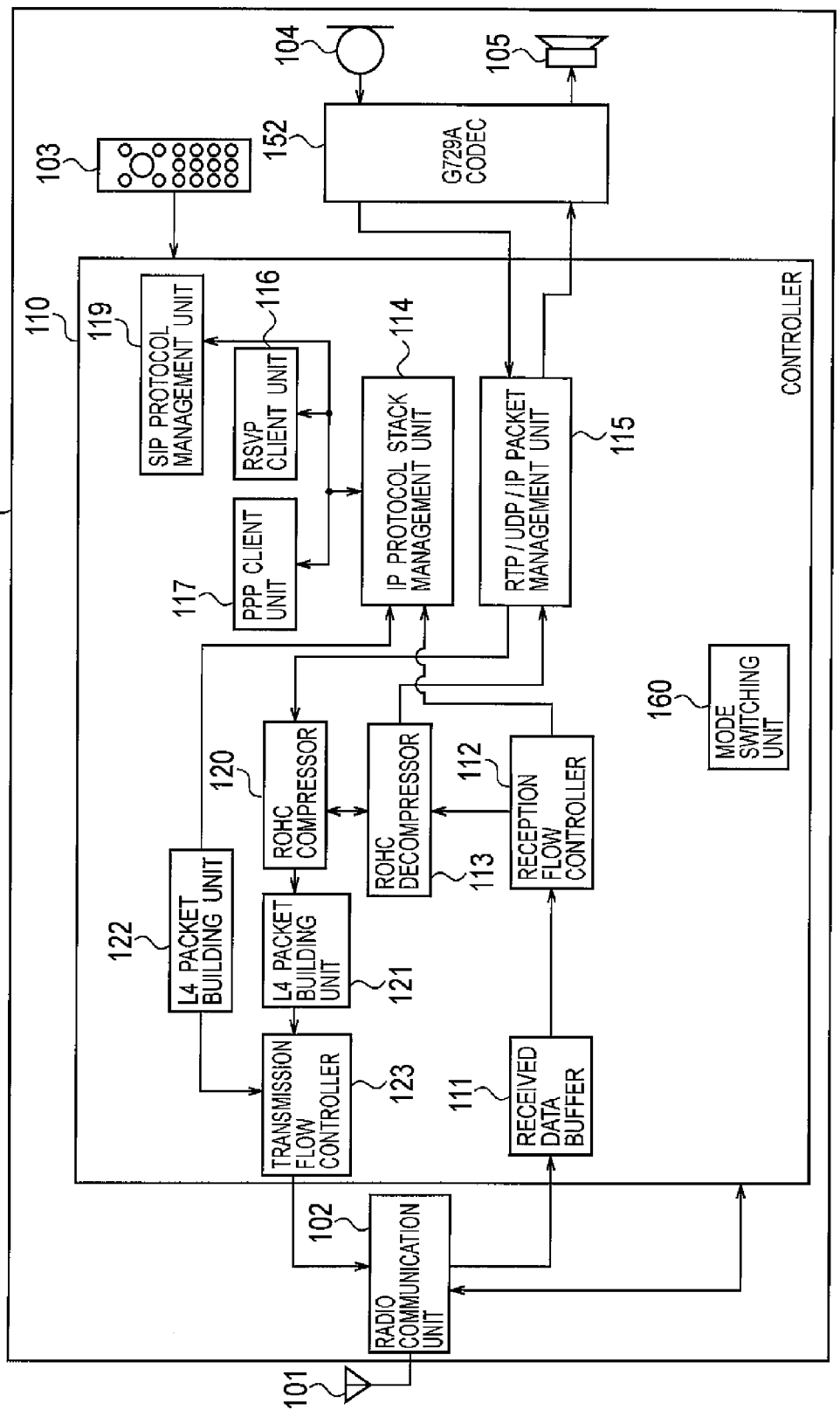
FIG. 6 is a functional block configuration diagram of a radio communication terminal according to the embodiment of the present invention.

FIG. 6 is a functional block configuration diagram of the radio communication terminal 100. As shown in FIG. 6, the radio communication terminal 100 has an antenna 101, a radio communication unit 102, a keypad 103, a microphone 104, a speaker 105, a G729A codec 152, and a controller 110.

In the present embodiment, the radio communication unit 102 functions as a radio communication channel setting unit configured to set a radio communication channel CH between the radio communication terminal 100 and the radio base station 200A. The radio communication unit 102 communicates with the radio base station 200A through the set radio communication channel CH.

The radio communication unit 102 monitors broadcast information which is broadcasted by the respective radio base stations 200A to 200C. In other words, the radio communication unit 102 functions as a handover executing unit configured to execute a handover to switch the destination radio base station. Incidentally, the radio communication unit 102 performs adaptive modulation based on a received SINR.

The controller 110 functions as a communication session setting unit configured to set an auxiliary service instance ASI (a first communication session) and a main service instance MSI (a second communication session) between the radio communication terminal 100 and the PDSN 300.

In addition, the controller 110 functions as a session setting mode selector configured to select any one of a shared channel mode (a first session setting mode) and an occupied channel mode (a second session setting mode) depending on a communication condition of the radio communication terminal 100.

Here, the shared channel mode means a mode in which the auxiliary service instance ASI and the main service instance MSI are set on the same radio communication channel CH. The occupied channel mode means a mode in which the auxiliary service instance ASI and the main service instance MSI are set on different radio communication channels CH1 and CH2 (see, FIG. 9).

Furthermore, the controller 110 functions as an identifier adding unit configured to add an identifier to a particular type of packet (that is, a RTP packet) if the shared channel mode is selected, the identifier indicating that transmission is made by so using the auxiliary service instance ASI. In the present embodiment, the identifier is referred to as a service instance flow ID (a session identifier).

To be more specific, the controller 110 has a reception data buffer 111, a reception flow controller 112, a ROHC decompressor 113, an IP protocol stack management unit 114, a RTP/UDP/IP packet management unit 115, a RSVP client unit 116, a PPP client unit 117, an SIP protocol management unit 119, a ROHC compressor 120, L4 packet building units 121 and 122, a transmission flow controller 123, and a mode switching unit 160.

The mode switching unit 160 selects any one of the shared channel mode and the occupied channel mode. Specifically, the mode switching unit 160 switches from the shared channel mode to the occupied channel mode and switches from the occupied channel mode to the shared channel mode.

The transmission flow controller 123 has a function to negotiate with the radio base station 200A. The transmission flow controller 123 stores and retains contexts such as a packet context of the auxiliary service instance ASI, a type of service option, and a flow ID.

In the uplink communication, the G729A codec 152 samples voice data from the microphone 104 and converts the sampled voice data to a codec payload. The converted voice data goes through the RTP/UDP/IP packet management unit 115 and then compressed by the ROHC compressor 120.

The resultant ROHC-compressed RTP/UDP/IP packet goes through the L4 packet building unit 121 and the transmission flow controller 123, and then transmitted. At this time, the radio communication unit 102 transmits the packet to the radio base station 200A by using the radio communication channel CH corresponding to the auxiliary service instance ASI.

The packet storing data other than voice data goes the IP protocol stack management unit 114 and the L4 packet building unit 122, and then transmitted to the radio base station 200A by the radio communication unit 102 via the radio communication channel CH corresponding to the main service instance MSI through.

In the downlink communication, when the radio communication unit 102 receives the packet through the radio communication channel CH from the radio base station 200A, the received packet is inputted to the reception flow controller 112 through the receiving data buffer 111.

In the occupied channel mode, the reception flow controller 112 controls whether to input to the ROHC decompressor 113 or to the IP protocol stack management unit 114, based on the type of service instance associated with the radio communication channel CH.

Specifically, the reception flow controller 112 inputs the packet received through the radio communication channel CH corresponding to the main service instance MSI to the IP protocol stack management unit 114. On the other hand, the reception flow controller 112 inputs the packet received through the radio communication channel CH corresponding to the auxiliary service instance ASI to the ROHC decompressor 113.

After being ROHC decompressed, the packet inputted to the ROHC decompressor 113 is inputted to the G729A codec through the RTP/UDP/IP packet management unit 115. Then, the G729 codec 152 converts G729A voice data inside the inputted packet into voice data and then output it from the speaker 105 as a voice.

In the shared channel mode, the receiving flow controller 112 controls whether to input the received packet to the ROHC decompressor 113 or to the IP protocol stack management unit 114, based on the service instance flow ID added to the received packet.

(2.2) Configuration of the Radio Base Station 200

Figure 7:
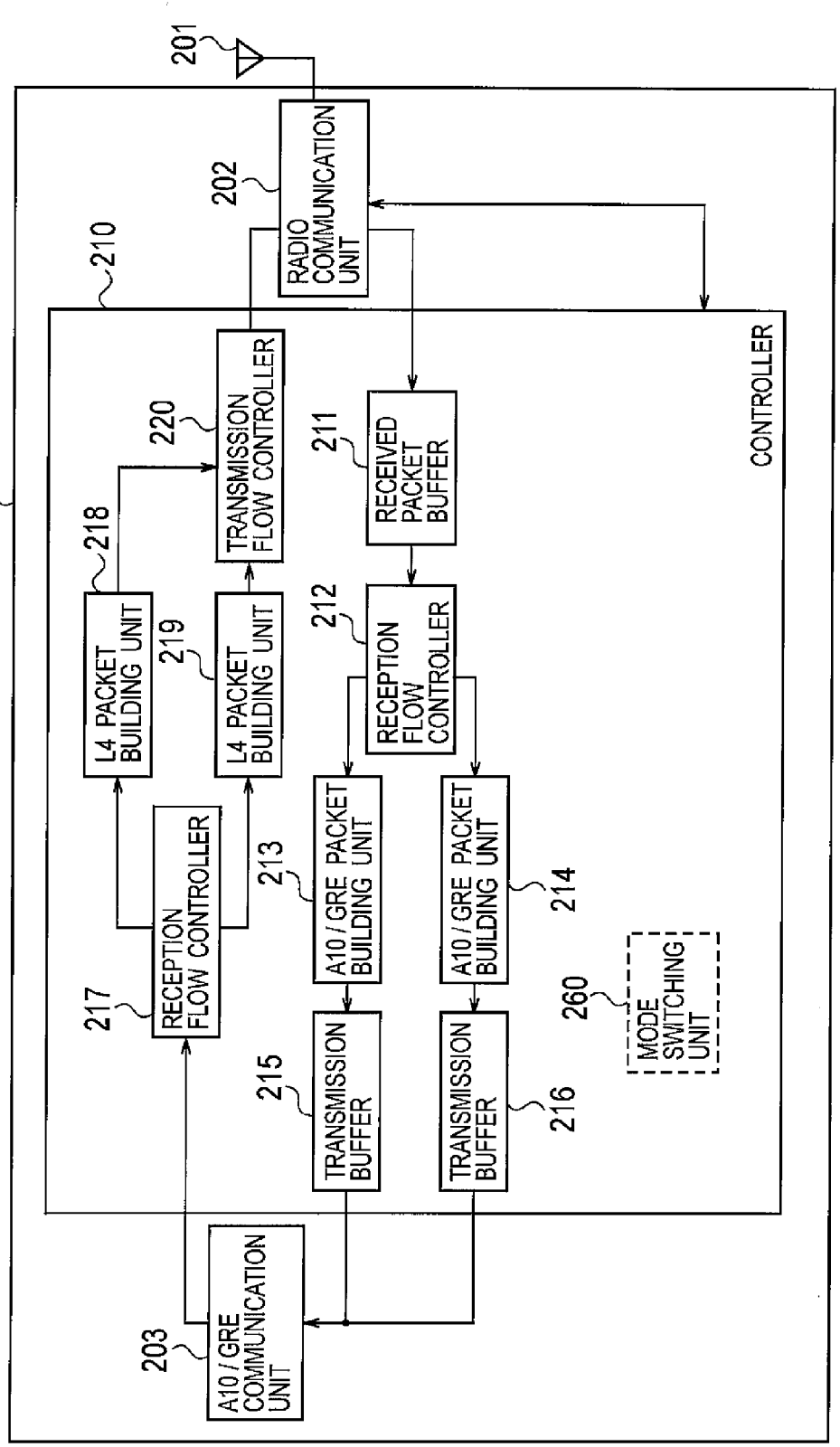
FIG. 7 is a functional block configuration diagram of a radio base station according to the embodiment of the present invention.

FIG. 7 is a functional block configuration diagram of the radio base station 200A. As shown in FIG. 7, the radio base station 200A includes an antenna 201, a radio communication unit 202, an A10/GRE communication unit 203, and a controller 210.

The radio communication unit 202 establishes a radio communication channel CH between the radio base station 200A and the radio communication terminal 100, and functions as an interface for the radio communication terminal 100. The radio communication unit 202 broadcasts broadcast information over a control area of the radio base station 200A. Also, the radio communication unit 102 performs adaptive modulation based on a received SINR. On the other hand, the A10/GRE communication unit 203 functions as an interface for the PDSN 300.

The controller 210 includes a received packet buffer 211, a reception flow controller 212, A10/GRE packet building units 213 and 214, transmission buffers 215 and 216, a reception flow controller 217, L4 packet building units 218 and 219, and a transmission flow controller 220.

In the uplink communication, the packet which is received from the radio communication terminal 100 by the radio communication unit 202 is inputted to the reception flow controller 212 through the reception packet buffer 211.

In the occupied channel mode, the reception flow controller 212 distributes the received packets according to the type of service instance associated with the radio communication channel CH. Specifically, the reception flow controller 212 inputs the packet received through the radio communication channel CH corresponding to the main service instance MSI to the A10/GRE packet building unit 213. On the other hand, the reception flow controller 212 inputs the packet received through the radio communication channel CH corresponding to the auxiliary service instance ASI to the A10/GRE packet architecture unit 214.

In the shared channel mode, the reception flow controller 212 controls whether to input the received packet to any one of the A10/GRE packet building units 213 and 214, based on the service instance flow ID added to the received packet.

In the downlink communication, the packet which is received by the A10/GRE communication unit 203 from the PDSN 300 is transmitted to the reception flow controller 217. According to the type of service instance associated with the A10 connection, the transmission flow controller 220 switches whether to input the received packet to the L4 packet building unit 218 associated with the main service instance MSI or to the L4 packet building unit 219 associated with the auxiliary service instance ASI. In addition, the transmission flow controller 220 negotiates with the radio communication terminal 100, and stores and retains the packet contexts of the auxiliary service instance PSI.

(2.3) Configuration of the PDSN 300

Figure 8:
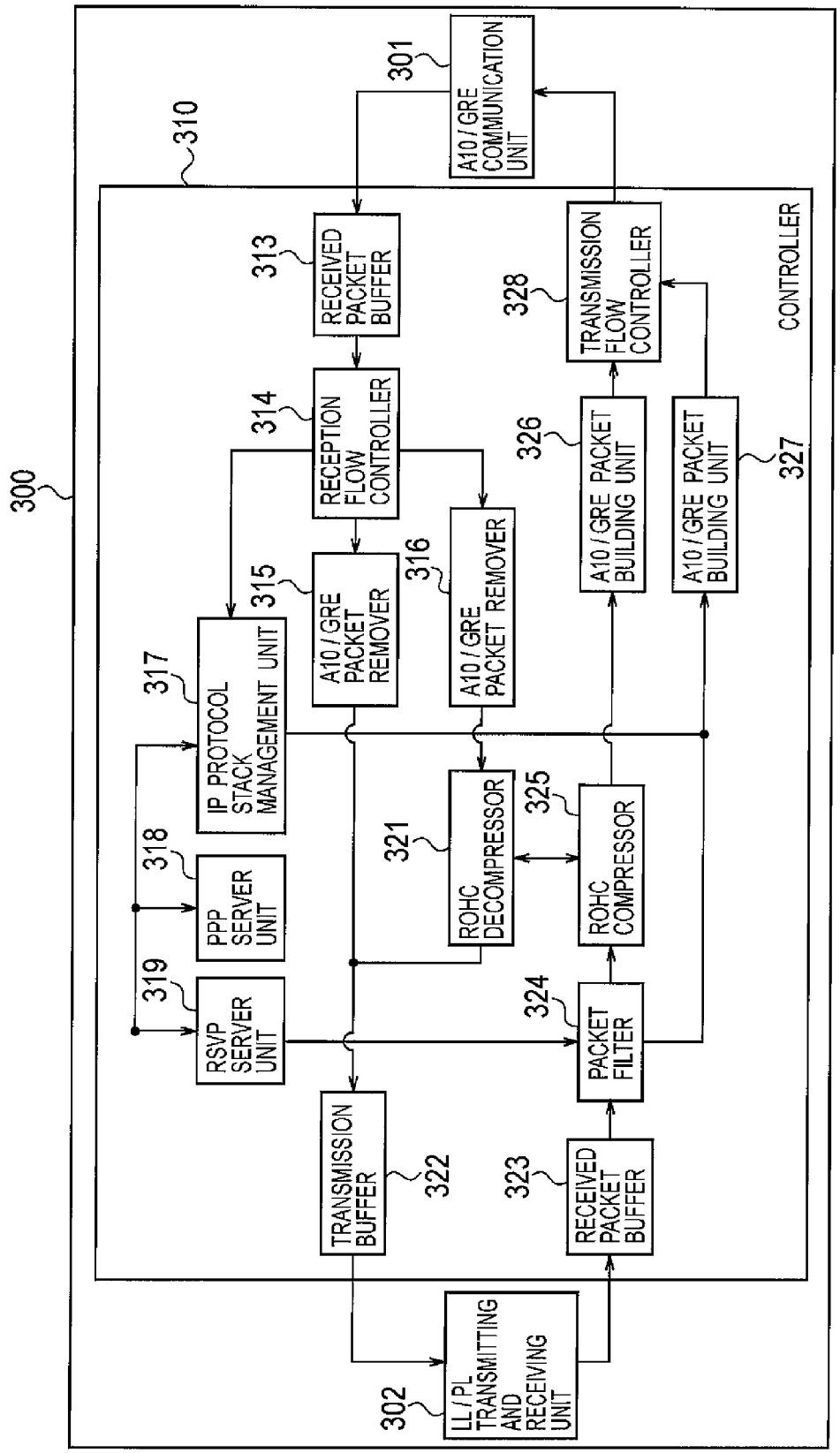
FIG. 8 is a functional block configuration diagram of PDSN according to the embodiment of the present invention.

FIG. 8 is a functional block configuration diagram of the PDSN 300. As shown in FIG. 8, the PDSN 300 has an A10/GRE communication unit 301, an LL/PL transmitting and receiving unit 302, and a controller 310.

The LL/PL transmitting and receiving unit 302 is a functional block for realizing an interface with the Internet 400 at a link layer (LL) level and a physical layer (PL) level. The A10/GRE communication unit 301 is a functional block for realizing an interface with the radio base station 200A.

The controller 310 includes a reception packet buffer 313, a reception flow controller 314, A10/GRE packet removers 315 and 316, an IP protocol stack management unit 317, a PPP server unit 318, a RSVP server 319, a ROHC decompressor 321, a transmission buffer 322, a received packet buffer 323, a packet filter 324, a ROHC compressor 325, A10/GRE packet building units 326 and 327, and a transmission flow controller 328.

Among the packets received by the A10/GRE communication unit 301 from the radio base station 200A, the packet received through the main service instance MSI includes a packet, for example, PPP or RSVP which is to be transmitted from the radio communication terminal 100 to the PDSN 300. The reception flow controller 314 inputs the packet for the PDSN 300 to the IP protocol stack management unit 317.

The packet which is transmitted through the main service instance and has a destination other than the PDSN 300 is transmitted to the LL/PL transmitting and receiving unit 302 after the A10/GRE header is removed by either one of the A10/GRE packet removers 315 or 316.

If the packet, among the received packets, which is transmitted through the auxiliary service instance ASI is received, the reception flow controller 314 inputs the packet into the ROHC decompressor 321 after removing the A10/GRE. The ROHC decompressor 321 reconstructs the IP packet through ROHC decompression, and then transmits the IP packet to the LL/PL transmitting and receiving unit 302 through the transmission buffer 322.

The packet received by the LL/PL transmitting and receiving unit 302 from the Internet 400 is distributed by the packet filter 324 according to the criteria negotiated with the radio communication terminal 100 based on RSVP. Specifically, the packet filter 324 distributes the packet to any one of the A10/GRE packet building unit 326 associated with the auxiliary service instance ASI and the A10/GRE packet building unit 327 associated with the main service instance MSI.

In addition, the transmission flow controller 328 negotiates with the radio communication terminal 100 based on the RSVP protocol, and stores and retains the contexts such as a service option and a flow ID.

(3) Shared Channel Mode and Occupied Channel Mode

Next, by referring to FIGS. 9 to 11, the shared channel mode, the occupied channel mode, and a process of switching between the shared channel mode and the occupied channel mode will be described in detail.

In the present embodiment, the mode switching unit 160 provided in the controller 110 of the radio communication terminal 100 switches between the shared channel mode and the occupied channel mode, which is triggered by a change of a radio quality or execution of a handover.

(3.1) Shared Channel Mode

Figure 9:
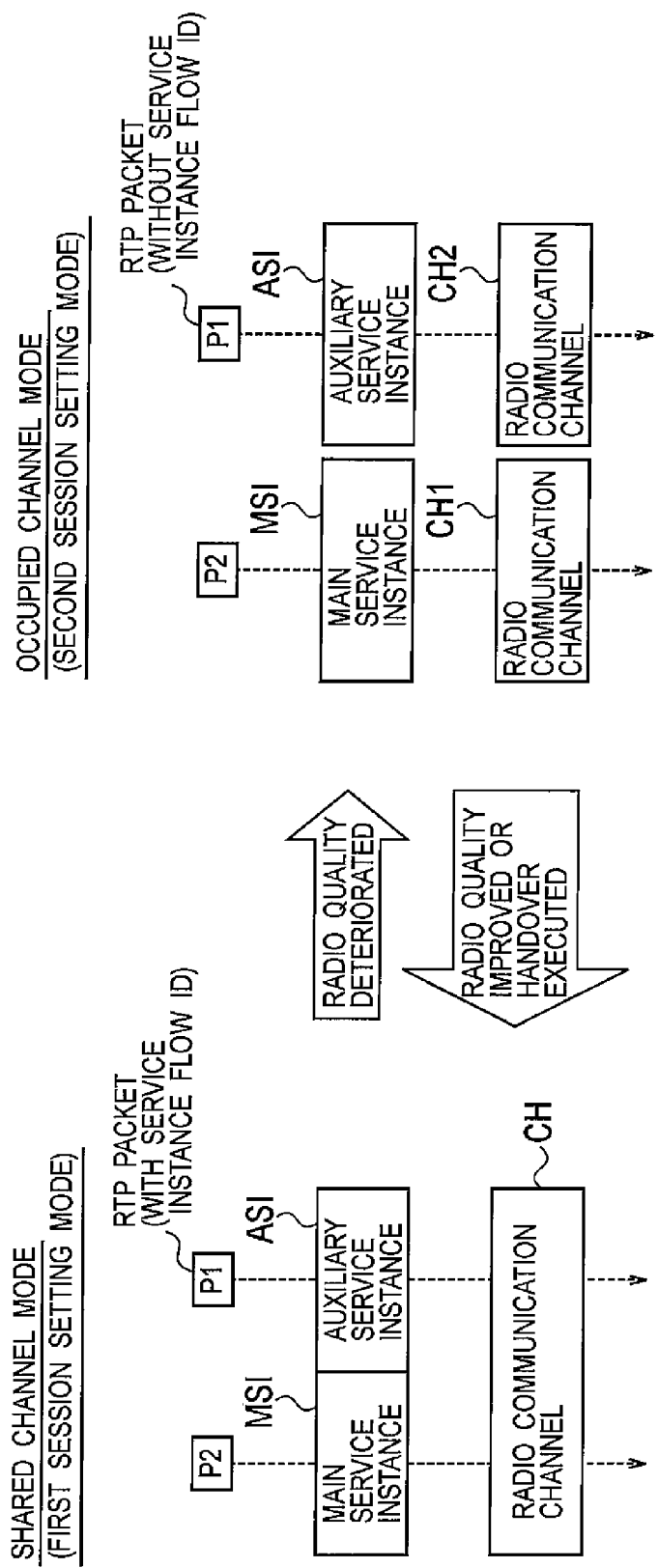
FIG. 9 is a conceptual diagram for illustrating a shared channel mode and an occupied channel mode according to the embodiment of the present invention.

As shown in FIG. 9, in the shared channel mode, the radio communication terminal 100 and the radio base station 200A set the main service instance MSI and the auxiliary service instance ASI on one radio communication channel CH.

With this configuration, one radio communication channel CH can be shared by multiple service instances. Accordingly, with the shared channel mode, if a bandwidth of the radio communication channel CH is wide, the radio communication terminal 100 and the radio base station 200A can effectively take an advantage of the bandwidth.

In the shared channel mode, as an overhead, an identifier to indicate the service instance is buried in a header of a packet P1 to be transmitted through the auxiliary service instance ASI. When the communication bandwidth of the radio communication channel CH is wide, a decrease in throughput due to the service instance flow ID becomes relatively small.

Note that, for adapting the shared channel mode, there may be only one radio communication channel assignable to the radio communication terminal 100, in the radio base station which is the connection destination of the radio communication terminal 100.

For this reason, in the present embodiment, the shared channel mode is selected when the radio communication terminal 100 and the radio base station 200A start a communication with each other. When the shared channel mode is selected at the time of starting the communication, it can be avoided that the communication cannot be continued due to the fact that the radio communication channel cannot be assigned.

(3.2) Occupied Channel Mode

In the occupied channel mode, the radio communication terminal 100 and the radio base station 200A set a radio communication channel CH2 dedicated for the auxiliary service instance ASI. Then, the radio communication terminal 100 and the radio base station 200A set the auxiliary service instance ASI on the radio communication channel CH2 dedicated for the auxiliary service instance ASI.

When the radio communication terminal 100 is positioned in, for example, a cell edge, there is a case where only an extremely narrow bandwidth may be secured. Even in such a case, a packet P1 having a higher priority can be continuously transmitted by setting the auxiliary service instance ASI on the radio communication channel CH2 dedicated therefor.

Furthermore, in the occupied channel mode, detailed QoS control closely based on the physical layer or a L2 can be performed for each service instance.

In the occupied channel mode, it comes to be apparent that the overheads of the packets P1 transmitted through the auxiliary service instance ASI are common. Accordingly, the overhead due to the service instance flow ID for indicating the auxiliary service instance ASI can be omitted.

However, in order to adapt the occupied channel mode, there have to be multiple radio communication channels assignable to the radio communication terminal 100 in the radio base station which is the connection destination of the radio communication terminal 100.

(3.3) Process of Switching Between the Shared Channel Mode and the Occupied Channel Mode Next, the process of switching between the shared channel mode and the occupied channel mode will be described.

(3.3.1) Process of Switching Triggered by a Change of a Radio Quality

As shown in FIG. 9, the mode switching unit 160 compares a radio quality with a threshold value and performs switching from the shared channel mode to the occupied channel mode and switching from the occupied channel mode to the shared channel mode based on the comparison result. A specified example of determination criteria of the communication quality will be described later.

The mode switching unit 160 switches from the occupied channel mode to the shared channel mode if the radio quality exceeds the threshold value, that is, if the radio quality is improved. The mode switching unit 160 selects the occupied channel mode if the radio quality becomes below the threshold value, that is, if the radio quality is deteriorated.

If the radio quality is good and there is a sufficient surplus bandwidth even when service instances are assigned to one radio communication channel CH, the mode switching unit 160 selects the shared channel mode. In the shared channel mode, the surplus communication bandwidth can be used for a packet having usage with a lower priority order.

In the shared channel mode, QoS is common in the physical layer and the L2. However, the communication bandwidth is sufficiently present and thus a packet transmission quality can be sufficiently secured without executing the detailed QoS control.

In contrast, if the radio quality is bad and it is difficult to secure the bandwidth, the mode switching unit 160 selects the occupied channel mode.

In the occupied channel mode, the radio communication channel CH2 is caused to be occupied by the auxiliary service instance ASI whose priority order of requiring the QoS control is high. Accordingly, the detailed QoS control which is performed based on the physical layer and the L2 can be individually performed. Thus, the narrow bandwidth can be carefully dealt, so that the transmission quality can be sufficiently secured.

Furthermore, in the occupied channel mode, by omitting the service instance flow ID, the overhead is set to minimum, and the bandwidth which can be used by the auxiliary service instance ASI can be secured as much as possible.

(3.3.2) Process of Switching Triggered by Execution of a Handover

As shown in FIG. 9, the mode switching unit 160 switches from the occupied channel mode to the shared channel mode if the radio communication unit 102 executes a handover.

A radio base station to be connected after the radio communication terminal 100 executes the handover (hereinafter referred to as a "handover destination radio base station") may have only one radio communication channel assignable to the radio communication terminal 100. Accordingly, if the occupied channel mode is adapted before executing the handover, a discontinuous communication is avoided by switching to the shared channel mode after executing the handover.

Another option is to have a mechanism in which the number of available radio communication channels is notified from the handover destination radio base station in advance. However, even if it is notified that multiple available radio communication channels are present, there may be actually only one radio communication channel available after the handover. Such case as this is likely caused that the communication cannot be continued.

Note that even if the channel mode is switched to the shared channel mode after the handover, the channel mode can be switched to the occupied channel mode again when the radio quality is deteriorated thereafter.

In addition, as described above, since the radio quality is more improved after the handover than before the handover, there is a high possibility that a wide communication bandwidth can be effectively utilized when the shared channel mode is used after the handover.

(3.4) One Example of Determination Criteria of a Radio Quality

In the present embodiment, modulation class used for adaptive modulation is used as a determination criterion of a radio quality. FIG. 10 is a table showing modulation classes used for the adaptive modulation.

The radio communication terminal 100 and the radio base station 200A support the modulation classes expressed as pairs of multiple modulation schemes and coding rates. A Throughput in FIG. 10 shows a throughput per physical channel.

In each modulation class, required SINR is defined. As the modulation class has a higher required SINR, the throughput becomes larger. As the modulation class has a lower required SINR, the throughput becomes smaller.

If the received SINR is higher than the required SINR, the radio communication terminal 100 and the radio base station 200A select the highest possible modulation class as high as possible, thereby securing a high throughput.

If the receiving SINR is low, the radio communication terminal 100 and the radio base station 200A select a lower modulation class, thereby controlling the communication to be continued.

If the auxiliary service instance ASI is in the occupied channel mode, the mode switching unit 160 monitors the modulation classes used for transmission and reception. If either one of the modulation classes used for transmission or reception is less than three, the radio communication terminal 100 determines that the communication bandwidth per physical channel is insufficient. Then, the occupied channel mode is continued.

If both the modulation classes used for transmission and reception are equal to or larger than three, the mode switching unit 160 determines that the bandwidth per physical channel is sufficient, and switches from the occupied channel mode to the shared channel mode.

As a result, under a situation where the modulation classes having high throughputs are selected, a bandwidth is assigned to the auxiliary service instance ASI by using the shared channel mode, so that preferable VoIP can be performed. In contrast, in a situation where the modulation classes with low throughputs are dominantly selected, the occupied channel mode is selected to minimize the overhead as possible.

(3.5) Details of the Handover Process

As described above, the mode switching unit 160 switches from the occupied channel mode to the shared channel mode if the radio communication unit 102 performs a handover. The handover process carried out by the radio communication unit 102 will be described below in detail.

FIGS. 11A and 11B are diagrams showing a super frame configuration and a broadcast information frame format which are used for radio communications between the radio communication terminal 100 and the radio base stations 200A to 200C.

The downlink slot #1 shown in FIG. 5 is used as a broadcast information channel and is used in the following manner. A broadcast information channel burst for one radio base station is in each odd number frame shown in FIG. 11A. The downlink slot #1 is divided into 8 groups in total. That is, in the communication system 10, totally eight radio base stations can be present in the same region.

The radio communication unit 102 receives broadcast information B0 to B7. Then, the radio communication unit 102 collects information on radio qualities and contents and compares the one information to another so as to determine whether the destination radio base station should be switched or the current connection with the radio base station 200A should be maintained.

A symbol coding format of the broadcast information is shown in FIG. 11B. The information of 545 symbols in total is transported. Note that, each symbol requires 2 microseconds.

The radio communication unit 102 performs a receiving operation on the carrier during a period long enough to include B0 to B7. Specifically, the radio communication terminal 102 down-converts the received signal from the antenna 101 and demodulates it to an information string for each symbol. Then, the radio communication unit 102 successively monitors the information string for each symbol. When recognizing an information string matching UW, the radio communication unit 102 records the position thereof and analyzes the symbol information string under the assumption that the broadcast information element is present for a certain period thereafter. The radio base station is identified by analyzing the symbol information string. At the same time, an electric field intensity and timing of the broadcast information channel burst transmitted by each radio base station are collected.

The broadcast information becomes smaller than the timeslot in the downlink by having an expansion guard time before and after the broadcast information. For this reason, while synchronizing with a broadcast information channel of an arbitral base station, a broadcast information channel of another radio base station (a radio station having a different distance from the radio communication terminal 100) can be received within a range of a receiving window of the same downlink timeslot.

Supposing that a radio transmission speed is 300,000 m per second, a relative distance from the radio communication terminal 100 is 300 m per microsecond. Accordingly, if the radio communication unit 102 adjusts the head of the downlink timeslot in the guard time of any base station, it is possible to receive, in timing wise, broadcast information transmitted by a radio base station, a relative distance from which to the radio communication terminal 100 is 0.3×43=12.9 km.

With the above-described system, the radio communication unit 102 collects the electric field intensity and timing of the broadcast information transmitted by each radio base station, during the period when the radio communication unit 102 is connected with a certain radio base station (in stand-by and communication states).

(4) Packet Configuration in Each Service Instance

Next, a packet configuration in each service instance will be described by referring to FIGS. 12 to 14.

(4.1) Packet Configuration in the Main Service Instance

FIG. 12 is a table showing a size of a payload and a header in the main service instance MSI.

In FIG. 12, the PPP header means a header defined by RFC1662: PPP in HDLC-like Framing.

As described above, the service instance flow ID is an identifier for indicating a service instance and is determined by a negotiation between the radio base station 200A and the radio communication terminal 100 when each service instance is established.

It is to be noted that an L3 delimiter is a delimiter tag for cutting out the L3 packet from an octet string transferred with an octet stream in a layer upper than the physical layer and the L2 layer, and displays a position of the next delimiter tag.

With a function of automatic repeat control (ARC) in the L2, the octet stream from the physical layer is sorted in the order intended by the transmission side, and delivered to the upper layer. However, since the octet stream is delivered as an octet stream, a mechanism for cutting out the L3 packet is required. The L3 delimiter is an overhead for clearly showing a delimiter of the L3 packet by designating a position to the next delimiter. The reception side can cut out the L3 packet based on the delimiter.

(4.2) Packet Configuration in the Auxiliary Service Instance

FIG. 13 is a table showing a size of a payload and a header in the auxiliary service instance ASI (when the shared channel mode is used).

In FIG. 13, the meaning of each overhead is similar to that in the case of the main service instance. However, since the service option 67 (SO67) is selected as the auxiliary service instance ASI, the overhead of the PPP header is omitted. Instead, the protocol distributed in the upper layer is limited to ROHC.

Incidentally, in the auxiliary service instance ASI, overhead in the PPP header is omitted. Context information such as a protocol field is implicitly transmitted by a negotiation between the PDSN 300 and the radio communication terminal 100 according to the RSVP protocol.

In addition, a filed having a fixed value supplements a fixed value on the reception side as implicit transmission. A FCS field is also implicitly transmitted, and after calculating a data length based on the L3 delimiter, the reception side supplements the FCS field by performing recalculation.

(4.3) Packet Configuration in the Auxiliary Service Instance (when Occupied Channel Mode is Used)

FIG. 14 is a table showing a size of a payload and a header in the auxiliary service instance ASI (when the occupied channel mode is used).

In FIG. 14, a meaning of each overhead is same as that in the case of the main service instance. Since the channel is occupied, the service instance flow ID is obvious and is thus omitted.

(5) Packet Flow Control Processing

Next, the packet flow control processing executed in the radio communication terminal 100 and the radio base station 200A will be described.

In a case where an UDP protocol is used in a VoIP application, data is not retransmitted in the upper layer. A CODEC payload which missed a reproduction opportunity due to delay is abandoned by the application.

Accordingly, in the VoIP application, there is a case where a subjective voice quality can be more effectively maintained when improving a possibility that the following data would arrive in real time by positively abandoning the unallowably delayed packet, rather than causing delay of the following data arrival for securing the reliability of the data transmission of the delayed data.

Thus, when the retransmission of the unallowably delayed packet is suppressed, a transmission path suitable for the VoIP application can be provided.

Also, the data transmitted from the radio communication terminal 100 to the radio base station 200A and the data transmitted from the radio base station 200A to the radio communication terminal 100 may be delayed due to the deterioration of the radio quality.

In such case, the transmission data is stored in the transmission buffer on the transmission side and waits until the radio quality is improved so that transmission can be performed. However, there may be a case where the radio quality is not improved. In such case, the transmission buffer is flooded due to the arrival of the following data. Thus, the older data have to be abandoned.

The packet which is transmitted through the auxiliary service instance ASI is RTP/UDP/IP having G729A voice data as a RTP payload. Accordingly, a subjective voice quality is better when it is secured that the data arrives in real time even at the expense of abandoning the packet, rather than increasing the reliability of data arrival by retransmission.

Accordingly, the radio communication terminal 100 and the radio base station 200A control the auxiliary service instance ASI so as to downsize the transmission buffer and positively abandon the packets having arrived in about past three seconds or before.

In contrast, the radio communication terminal 100 and the radio base station 200A prepare a relatively large transmission is buffer for the main service instance MSI in consideration of distribution of important data for maintaining the SIP telephone. With this, it can be controlled that abandonment of the packet is not caused as much as possible.

By the difference between the transmission buffer sizes of the main service instance MSI and the auxiliary service instance ASI, QoS to increase the reliability of data arrivability by avoiding packet deletion is given to the main service instance MSI, and QoS to increase accuracy of real-time data arrivability is given to the auxiliary service instance ASI.

(5.1) Packet Flow Control Processing in the Shared Channel Mode

Figure 15A:
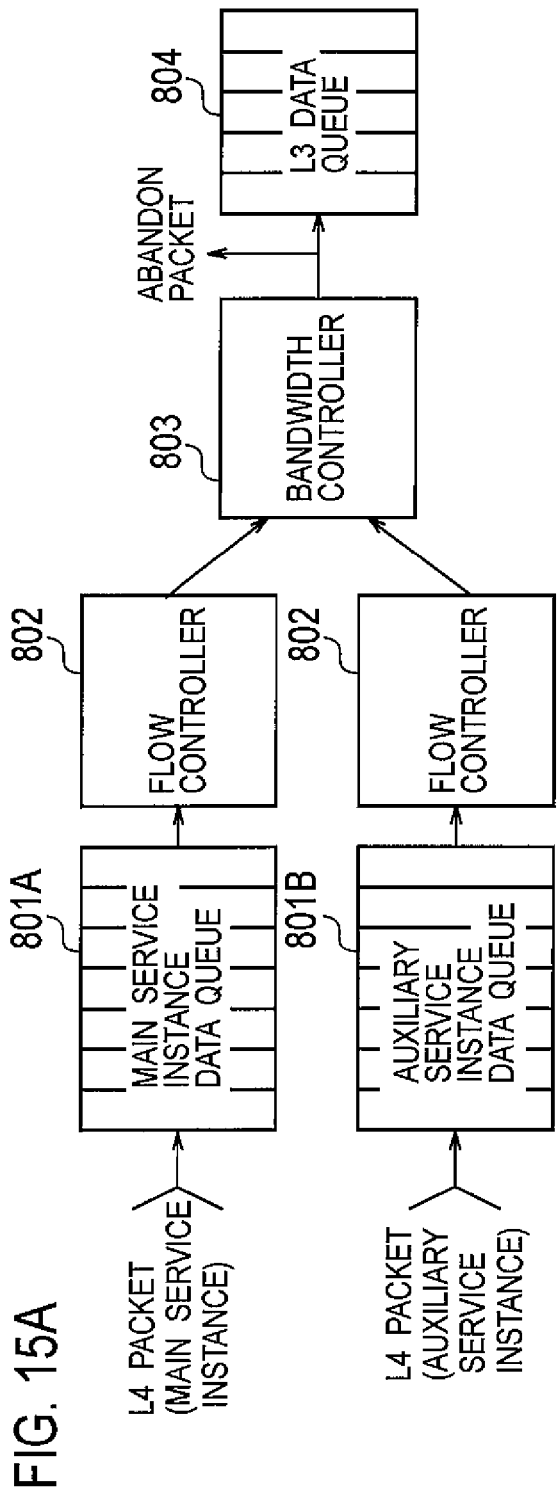
FIGS. 15A and 15B are diagrams for illustrating a packet flow control process in the shared channel mode according to the embodiment of the present invention.
Figure 15B:
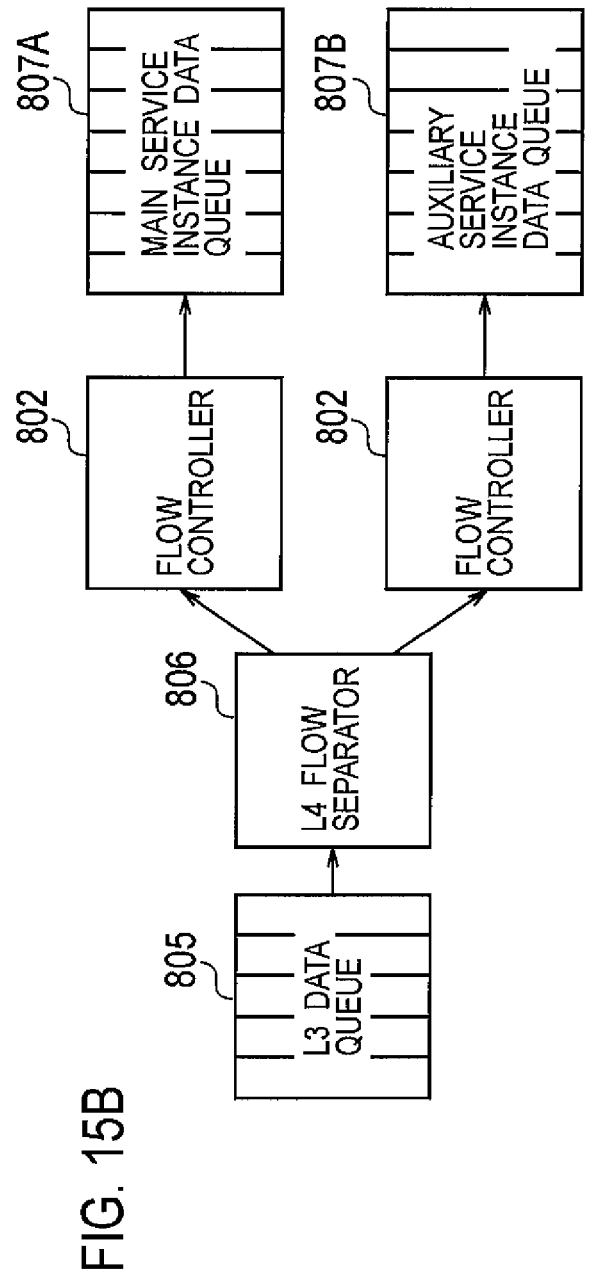

FIGS. 15A and 15B are diagrams for illustrating packet flow control processing in the shared channel mode. Individual functional blocks shown in FIGS. 15A and 15B correspond to the transmission flow controller, the reception flow controller, and the buffer shown in FIGS. 6 to 8.

As shown in FIG. 15A, packets flowing through all the service instances at the time of transmission are once stored in transmission data queues 801A and 801B which are separately prepared for the respective service instances. The corresponding service instance flow ID is then added thereto. Furthermore, in the case of the auxiliary service instance ASI, a PPP header is removed.

After that, a flow controller 802 forwards a packet to an L3 data queue 804 according to a priority order along with a flow rate of the packet. If a sufficient bandwidth is present, all the packets are forwarded to the L3 data queue 804.

If the bandwidth is narrow, a bandwidth controller 803 preferentially forwards the packets for the auxiliary service instance ASI to the L3 data queue 804. If the bandwidth is further narrowed, the bandwidth controller 803 performs control of sequentially abandoning the oldest packet among the packets stored in the data queue of the auxiliary service instance ASI.

As shown in FIG. 15B, an L4 flow separator 806 divides the packets from L3 into the respective service instances by using the service instance flow ID as a marker. With regard to the auxiliary service instance ASI, the flow controller 802 reconstructs an upper data packet by reconstructing a PPP header based on the context information for each auxiliary service instance ASI.

(5.2) Packet Flow Control Processing in the Occupied Channel Mode

FIGS. 16A and 16B are diagrams for illustrating packet flow control processing in the occupied channel mode. The individual functional blocks shown in FIGS. 16A and 16B correspond to the transmission flow controller, the reception flow controller, and the buffer shown in FIGS. 6 to 8.

As shown in FIG. 16A, the bandwidth controller 803 abandons only the packet flowing through the auxiliary service instance ASI. Other points are similar to those of FIG. 15A.

As shown in FIG. 16B, with regard to the auxiliary service instance ASI, identification information of the radio communication channel (specifically, a time slot number) and related information of the auxiliary service instance ASI with the flow ID are used to sort the packets. Other points are same as those of FIG. 15A.

(6) Detailed Operation of the Communication System

Next, a detailed operation of the communication system 10 will be described by referring to FIGS. 17 and 20.

(6.1) Sequence of Setting a Service Instance

FIG. 17 is a sequence diagram showing the sequence of setting a service instance in the communication system 10.

In step S102, the radio communication terminal 100 and the radio base station 200A establish a radio communication channel CH by using a timeslot with the slot number 0.

In step S104, the radio communication terminal 100 transmits a main service instance assignment request message to the radio base station 200A. At this time, the radio communication terminal 100 designates a flow profile. Since the designated profile is the main service instance, a flow ID is set to 1, and a service option is set to SO59, and then "new" and "shared" are designated as additive attributes.

In step S105, the radio base station 200A requests the PDSN 300 to establish the main service instance by using an A11 signaling protocol, according to the content of the profile requested from the radio communication terminal 100.

In step S106, the PDSN 300 transmits a response message to the radio base station 200A in response to the request in step S105.

In step S107, the radio base station 200A transmits a main service instance MSI assignment response message to the radio communication terminal 100.

In step S108, the main service instance MSI is established among the radio communication terminal 100, the radio base station 200A, and the PDSN 300.

In step S109, between the radio communication terminal 100 and the PDSN 300, the radio communication terminal 100 executes an establishment sequence of the PPP connection. In the establishment sequence of the PPP connection, the PDSN 300 assigns a global IP address to the radio communication terminal 100.

In step S110, the PPP connection is established among the radio communication terminal 100, the radio base station 200A, and the PDSN 300.

Through steps S111 to S117, the radio communication terminal 100 recognizes that a user uses an SIP telephone, and performs the following operations by using the main service instance MSI.

Exchange a message for SIP call, between the radio communication terminal 100 and the SIP service 600

Exchange the context of the auxiliary service instance ASI according to RSVP, between the radio communication terminal 100 and the PDSN 300.

Exchange a message for establishing the auxiliary service instance ASI between the radio communication terminal 100 and the radio base station 200A Since the auxiliary service instance ASI between the radio communication terminal 100 and the radio base station 200A is not established at this moment, it is established by the shared channel mode. Specifically, the auxiliary service instance ASI is assigned by sharing the physical channel with the slot number 1. At this time, the radio communication terminal 100 designates a flow profile.

In step S113, since the radio communication terminal 100 has the designated profile which is the auxiliary service instance ASI, the flow ID is set to a unique number equal to or larger than 2, the service option is set to S067, and "new" and "shared" are designated as additive attributes.

In step S114, according to the content of the profile requested from the radio communication terminal 100, the radio base station 200A requests the PDSN 300 to establish the auxiliary service instance ASI by using the A11 signaling protocol. By steps S115 and S116, a response message is transmitted to the radio communication terminal 100.

In step S117, the auxiliary service instance ASI is established among the radio communication terminal 100, the radio base station 200A, and the PDSN 300.

By the above-described sequence, the main service instance MSI and the auxiliary service instance ASI are established among the radio communication terminal 100, the radio base station 200A, and the PDSN 300.

The service instance flow ID, the slot number, and the context of the service instance are associated, and stored in each of the radio base station 200A and the radio communication terminal 100.

Note that the auxiliary service instance ASI between the radio communication terminal 100 and the radio base station 200A is realized by the shared channel mode.

Incidentally, after the auxiliary service instance ASI is established, through steps S118 to S125, the radio communication terminal 100 and the SIP server 600 transmit and receive an SIP message through the radio base station 200A and the PDSN 300. Additionally, the radio communication terminal 100 exchanges the packet context with the PDSN 300 according to RSVP. Then, in step S126, a flow context negotiation is established.

(6.2) Sequence of Switching from the Shared Channel Mode to the Occupied Channel Mode FIG. 18 is a sequence diagram showing the sequence of switching from the shared channel mode to the occupied channel mode.

Here, the auxiliary service instance ASI in the shared channel mode is established so as to be shared with the main service instance MSI on a radio communication channel configured of the timeslot having the slot number 1. Here, a unique number equal to or larger than 2 is assigned to the service instance flow ID.

In step S201, the radio communication terminal 100 establishes the physical channel having the slot number 2 between the radio communication terminal 100 and the radio base station 200A.

In step S202, the radio communication terminal 100 transmits an auxiliary service instance assignment request message to the radio base station 200A. The service instance flow ID and the service option number in the profile designated at this time are the same values as those which have been already assigned to the auxiliary service instance ASI. The radio communication terminal 100 designates the time slot number as 2 and designates "switch" and "occupied" as additive attributes.

In step S203, the radio base station 200A transmits a flow assignment response message to the radio communication terminal 100.

In step S204, the auxiliary service instance ASI is switched among the radio communication terminal 100, the radio base station 200A, and the PDSN 300. Specifically, the auxiliary service stance ASI is cut out from the physical channel having the time slot number 1 to the physical channel having the time slot number 2.

In steps S205 and S206, a packet is transmitted by using the auxiliary service instance ASI after the switching.

With the above-described sequence, the switching from the shared channel mode to the occupied channel mode is realized.

(6.3) Sequence of Switching from the Occupied Channel Mode to the Shared Channel Mode FIG. 19 is a sequence diagram showing the sequence of switching from the occupied channel mode to the shared channel mode.

Here, the auxiliary service instance ASI in the occupied channel mode is established with a slot number other than 1, and a unique number equal to or larger than 2 is assigned to the service instance flow ID.

In step S301, the radio communication terminal 100 transmits an auxiliary service instance assignment request message to the radio base station 200A. In the profile, 1 is designated as the time slot number, and "switch" and "occupied" are designated as additive attributes.

In step S302, the radio base station 200A transmits an auxiliary service instance ASI assignment response message to the radio communication terminal 100. After that, the switching of the auxiliary service instance ASI is completed (step S303).

In step 304, after the switching of the auxiliary service instance ASI is completed, the radio communication terminal 100 and the radio base station 200A disconnect the physical channel having the slot number 2 which will be no longer necessary. In steps S305 and S306, a packet is then transmitted by using the auxiliary service instance ASI after the switching. It is to be noted that the PDSN 300 is not particularly involved with this sequence.

(6.4) Handover Sequence

Next, the operation performed when the radio communication terminal 100 performs a handover will be described. FIG. 20 is a sequence diagram showing a handover operation in which the radio communication terminal 100 switches the connection destination from the radio base station 200A to the radio base station 200B. Here, a description will be given for the case where the occupied channel mode is adapted before the handover.

In step S401, the radio communication terminal 100 and the radio base station 200A establish a main service instance MSI on the slot 2.

In step S402, the radio communication terminal 100 and the radio base station 200A establish an auxiliary service instance ASI on the slot 3 in the occupied channel mode.

In step S403, upon occurrence of a handover trigger, the radio communication terminal 100 starts a handover to the radio base station 200B (step S404).

In step S405, a physical channel of the slot 2 from the radio communication terminal 100 to the radio base station 200B is established.

In step S406, after the physical channel of the slot 2 is established, the radio communication terminal 100 makes a request of assigning the main service instance flow by using a message. At this time, the radio communication terminal 100 designates a flow profile. Since the designated profile is the main service instance MSI, a flow ID is set to 1, and a service option is set to S059, and "handover" and "shared" are designated as additive attributes.

In step S407, by using the content of the profile requested from the radio communication terminal 100, the radio base station 200B establishes the main service instance MSI for the PDSN 300 through the A11 signaling protocol.

In steps S408 and S410, the PDSN 300 has already recognized the presence of the service instance, and thus recognizes that the handover is performed, and at the same time notifies the radio base station 200B of the related service instances.

In step S409, the radio base station 200A transmits a main service instance flow assignment response to the radio communication terminal 100. As a result, in step S411, the switching (handover) of the main service instance MSI is completed.

In step S412, the radio communication terminal 100 transmits an auxiliary service instance flow assignment request to the radio base station 200B. At this time, the radio communication terminal 100 designates a flow profile. Since the designated profile is the auxiliary service instance ASI, a flow ID is set to 2, and a service option is set to S067, and "handover" and "shared" are designated as additive attributes.

In step S413, the radio base station 200B transmits an auxiliary service instance flow assignment response to the radio communication terminal 100. Note that, the radio base station 200B has been notified of the handover of the auxiliary service instance ASI by the PDSN 300, and thus associates the auxiliary service instance ASI with the information from the radio communication terminal 100 and manages the auxiliary service instance ASI.

In steps S414 and S416, the PDSN 300 notifies the radio base station 200A of the fact that the service instance is updated, and then cancels the service instance between the PDSN 300 and the radio base station 200A.

In step S415 and S417, the radio communication terminal 100 and the radio base station 200A disconnects the radio communication channels having the slot numbers 2 and 3. As a result, in steps S418 and S419, the switching (handover) of the auxiliary service instance ASI is completed. Thereafter, in step S419, a packet is transmitted by using the switched auxiliary service instance ASI.

(7) Advantageous Effects

According to the above-described embodiment, in the shared channel mode, all types of packets are transmitted by using one radio communication channel. Therefore, if a communication bandwidth per radio communication channel is wide, the communication bandwidth can be utilized to the utmost extent.

In the occupied channel mode, RTP packet is transmitted by using the radio communication channel dedicated for RTP packet. Therefore, even if a communication bandwidth per radio communication channel is narrow, transmission delay of the RTP packet can be controlled.

A communication bandwidth per radio communication channel and the number of radio communication channels assignable to the radio communication terminal 100 change depending on a communication condition of the radio communication terminal 100 (that is, a radio quality or handover execution). Accordingly, by selecting any one of the shared channel mode and the occupied channel mode according to the communication condition of the radio communication terminal 100, a mode suitable for the communication condition of the radio communication terminal 100 can be implemented.

According to the present embodiment, the radio communication terminal 100 switches from the occupied channel mode to the shared channel mode when a handover is executed while multiple radio communication channels are set in the occupied channel mode between the radio communication terminal 100 and the radio base station 200A.

As a consequence, as long as at least one radio communication channel is available in the handover destination radio base station 200B, the auxiliary service instance ASI can be always continued. Furthermore, since the radio quality is more improved after the handover than before the handover, it is highly likely that a wide communication bandwidth can be effectively utilized by selecting the shared channel mode after the handover.

According to the present embodiment, based on the radio communication quality information, the radio communication terminal 100 determines whether or not the radio communication quality is improved. If it is determined that the radio communication quality is improved, the shared channel mode is selected. In this way, the radio communication terminal 100 can effectively utilize the wide communication bandwidth when the radio quality is preferable.

In addition, according to the present embodiment, the radio communication terminal 100 determines whether the communication quality is deteriorated, based on the radio quality information. If it is determined that the radio communication is deteriorated, the occupied channel mode is selected. In this way, when the radio quality is poor, the radio communication terminal 100 can individually perform detailed QoS control based closely on the physical layer and the L2. Thus, a sufficient transmission quality can be secured by carefully dealing with the narrow communication bandwidth.

Furthermore, according to the present embodiment, the radio communication terminal 100 omits the service instance flow ID in the occupied channel mode so that the overhead is minimized. Thus, available bandwidth for the auxiliary service instance ASI can be secured as much as possible.

(8) Other Embodiments

The present invention has been described by the preferred embodiment. However, it should be understood that the description and drawings which constitute a part of this disclosure does not limit the invention. From this disclosure, various alternative embodiments, examples, operational techniques will be apparent to a person skilled in the art.

(8.1) Modified Example of Communication Quality Information

In the above-described embodiment, as a reference for switching between the occupied channel mode and the shared channel mode, the approach of comparing the selected modulation class to a threshold value to be a reference for switching is used.

However, as a more detailed control method, it is also effective to provide a means for measuring a throughput of data transmitting the L2 and a table for storing the threshold value to be compared with this throughput, and to perform switching based on the comparison of these elements.

A situation where not only a using modulation class but also FER are high occurs frequently in the actual operation. In such case, a better result can be obtained by including the actual obtained amount of throughput in the determination criteria.

(8.2) Modified Example of the Auxiliary Service Instance

Figure 21:
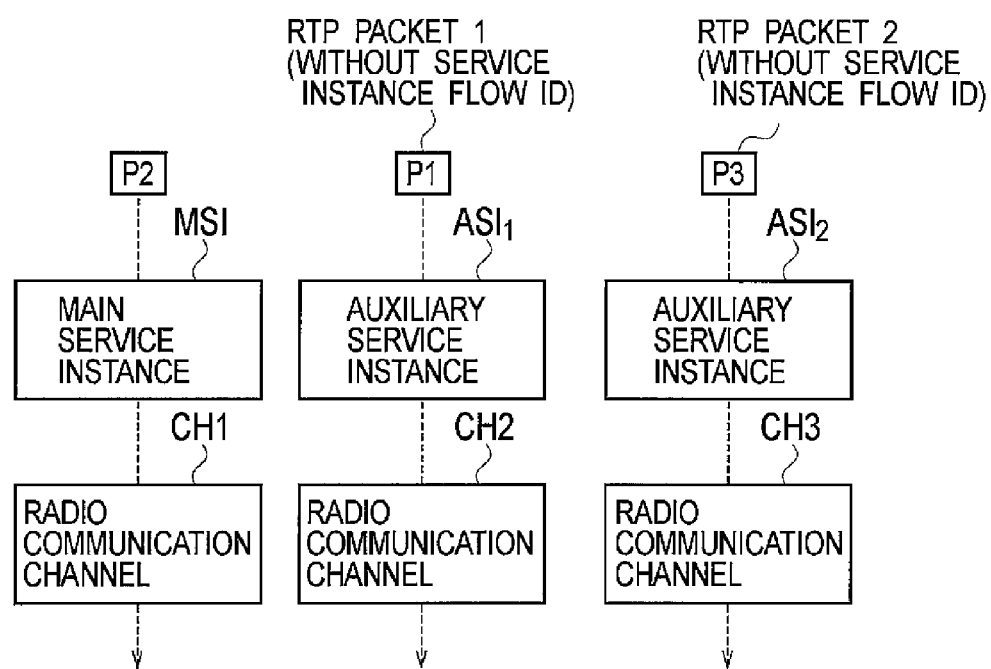
FIG. 21 is a diagram showing a modified example of the auxiliary service instance according to the embodiment of the present invention.

FIG. 21 is a diagram showing a modified example of an auxiliary service instance. As shown in FIG. 21, the auxiliary service instance ASI may be multiple.

In the case of an application like a television telephone, voice packet flow and image packet flow have conditions, such as a degree of influence by missing packet, data size, and the like, which largely differ from each other, and normally requires different QoS.

For this reason, a television telephone can be provided with a better quality as a whole if individual service instances are used to perform different QoS.

In the case of such QoS request, as shown in FIG. 19, assigning individual auxiliary service instances $ASI_1$ and $ASI_2$ respectively to the voice packet flow P1 and the image packet flow P3, may be one conceivable method. For example, just after a television telephone session is started, the main service instance MSI and the auxiliary service instances $ASI_1$ and $ASI_2$ are established in the shared channel mode.

If an electric wave condition is deteriorated and a modulation class is lowered and thus a throughput becomes difficult to be secured, the auxiliary service instance $ASI_1$ transferring the voice packet flow P1 is firstly switched to the occupied channel mode, so as to prevent missing of voice.

In the case of missing image data, the moving image only stops by the television telephone application processing. In contrast, missing voice data leads to a noise which normally causes unpleasantness. For this reason, the control of securing the voice data first is effective.

Also, the auxiliary service instance $ASI_2$ which transfers the image packet flow may be, of course, controlled so as to be switched to the occupied channel mode, if needed. When the electric wave condition is improved, the modulation class is increased and throughput becomes sufficient, a bandwidth to be an available capacity which cannot be used in the occupied channel mode becomes usable for other usages if the mode is returned to the shared channel mode again.

(8.3) Modified Example of the Radio Communication Terminal and the Radio Base Station In the above-described embodiment, various kinds of processes are described such that they are executed by the radio communication terminal 100. However, the processes can be also executed by the radio base station 200A if necessary. In this case, a mode switching unit 260 provided with the radio base station 200A selects any one of the occupied channel mode and the shared channel mode.

As has been described, it should be understood that the present invention includes various embodiments which are not described herein. Accordingly, the present invention is only limited by the particular matters contained in the scope of claims which are appropriate from this disclosure.

What is claimed is:

1. A radio communication terminal which transmits and receives a plurality of types of packets including a particular type of packet to and from a communication destination device through a radio base station, the radio communication terminal comprising:
   a radio communication channel setting unit configured to set radio communication channels between the radio communication terminal and the radio base station, the radio communication channels each being formed of at least one physical channel defined by a physical resource;

a communication session setting unit configured to set a first communication session and a second communication session between the radio communication terminal and the communication destination device, the first communication session being a logical communication path used for transmitting the particular type of packet, the second communication session being a logical communication path used for transmitting a type of packet different from the particular type of packet; and a session setting mode selector configured to select any one of a first session setting mode and a second session setting mode on the basis of a communication condition of the radio communication terminal, the first session setting mode including setting the first communication session and the second communication session on one of the radio communication channels, the second session setting mode including setting the first communication session and the second communication session on different ones of the radio communication channels, wherein the communication session setting unit sets the first communication session and the second communication session on one of the radio communication channels if the first session setting mode is selected by the session setting mode selector, the radio communication channel setting unit sets one of the radio communication channels to be dedicated for the first communication session if the second session setting mode is selected by the session setting mode selector, and the communication session setting unit sets the first communication session on the radio communication channel dedicated for the first communication session if the radio communication channel dedicated for the first communication session is set by the radio communication channel setting unit.

2. The radio communication terminal according to claim 1, further comprising:

a handover executing unit configured to execute a handover to switch the radio base station of a connection destination, wherein the session setting mode selector selects the first session setting mode if the handover is executed by the handover executing unit.

3. The radio communication terminal according to claim 1, wherein the session setting mode selector acquires radio quality information showing a radio quality between the radio communication terminal and the radio base station, the session setting mode selector determines whether or not the radio quality is improved, based on the acquired radio quality information, and the session setting mode selector selects the first session setting mode if it is determined that the radio quality is improved.

4. The radio communication terminal according to claim 1, wherein the session setting mode selector acquires radio quality information showing a radio quality between the radio communication terminal and the radio base station, the session setting mode selector determines whether or not the radio quality is deteriorated, based on the acquired radio quality information, and the session setting mode selector selects the second session setting mode if it is determined that the radio quality is deteriorated.

5. The radio communication terminal according to claim 1, further comprising:

a session identifier adding unit configured to add a session identifier to the particular type of packet when the first session setting mode is selected by the session setting mode selector, the session identifier indicating that packet transmission is made by using the first communication session, wherein the session identifier adding unit omits the addition of the session identifier to the particular type of packet if the second session setting mode is selected by the session setting mode selector.

6. The radio communication terminal according to claim 1, wherein the particular type of packet is a packet which needs to be transmitted with a transmission delay shorter than that for the type of packet different from the particular type of packet.

7. A radio base station which transmits and receives a plurality of types of packets including a particular type of packet to and from a radio communication terminal, the radio base station comprising:

a radio communication channel setting unit configured to set radio communication channels between the radio base station and the radio communication terminal, the radio communication channels each being formed of at least one physical channel defined by a physical resource;

a communication session setting unit configured to set a first communication session and a second communication session between the radio communication terminal and a communication destination device of the radio communication terminal, the first communication session being a logical communication path used for transmitting the particular type of packet, the second communication session being a logical communication path used for transmitting a type of packet different from the particular type of packet; and a session setting mode selector configured to select any one of a first session setting mode and a second session setting mode depending on a communication condition of the radio communication terminal, the first session setting mode including setting the first communication session and the second communication session on one of the radio communication channels, the second session setting mode including setting the first communication session and the second communication session on different ones of the radio communication channels, wherein the communication session setting unit sets the first communication session and the second communication session on one of the radio communication channels if the first session setting mode is selected by the session setting mode selector, the radio communication channel setting unit sets one of the radio communication channels to be dedicated for the first communication session if the second session setting mode is selected by the session setting mode selector, and the communication session setting unit sets the first communication session on the radio communication channel dedicated for the first communication session if the radio communication channel dedicated for the first communication session is set by the radio communication channel setting unit.

8. A packet communication method for transmitting and receiving a plurality of types of packets including a particular type of packet through a radio base station between a radio communication terminal and a communication destination device with which the radio communication terminal communicates, the packet communication method comprising the steps of:

setting radio communication channels between the radio communication terminal and the radio base station, the radio communication channels each being formed of at least one physical channel defined by a physical resource;

setting a first communication session and a second communication session between the radio communication terminal and the communication destination device, the first communication session being a logical communication path used for transmitting the particular type of packet, the second communication session being a logical communication path used for transmitting a type of packet different from the particular type of packet; and selecting any one of a first session setting mode and a second session setting mode depending on a communication condition of the radio communication terminal, the first session setting mode including setting the first communication session and the second communication session on one of the radio communication channels, the second session setting mode including setting the first communication session and the second communication session on to different ones of the radio communication channels, wherein in the step of setting the communication session, the first communication session and the second communication session are set on one of the radio communication channels if the first session setting mode is selected by the selecting step, in the step of setting the radio communication channels, one of the radio communication channels is set to be dedicated for the first communication session if the second session setting mode is selected by the selecting step, and in the step of setting the communication session, the first communication session is set on the radio communication channel dedicated for the first communication session if the radio communication channel dedicated for the first communication session is set in the step of setting the radio communication channels.

* * * * *